(12) United States Patent
Oka et al.

(10) Patent No.: US 6,556,137 B1
(45) Date of Patent: Apr. 29, 2003

(54) PASSENGER DETECTING SYSTEM AND AIR BAG APPARATUS USING THE SAME

(75) Inventors: Yoshitaka Oka, Osaka (JP); Satoshi Baba, Osaka (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/361,726

(22) Filed: Jul. 27, 1999

(30) Foreign Application Priority Data

Jul. 28, 1998 (JP) .......................................... 10-212949
Aug. 31, 1998 (JP) .......................................... 10-245894

(51) Int. Cl.$^7$ ................................................ G08B 13/26
(52) U.S. Cl. ...................... 340/561; 280/735; 307/9.1
(58) Field of Search ................................. 340/561, 562, 340/573.1; 701/45, 46, 47; 307/9.1; 280/730.2, 735

(56) References Cited

U.S. PATENT DOCUMENTS

| | | | | |
|---|---|---|---|---|
| 5,426,416 A | * | 6/1995 | Jefferies et al. | 340/664 |
| 5,844,415 A | | 12/1998 | Gershenfeld et al. | 324/663 |
| 5,948,031 A | * | 9/1999 | Jinno | 701/45 |
| 6,161,070 A | * | 12/2000 | Jinno | 701/45 |
| 6,208,249 B1 | * | 3/2001 | Saito | 340/561 |
| 6,263,271 B1 | * | 7/2001 | Oka | 701/41 |

FOREIGN PATENT DOCUMENTS

| | | |
|---|---|---|
| EP | 0838697 | 4/1998 |
| JP | 61-113527 | 5/1986 |
| JP | 3-52266 | 5/1991 |
| JP | 4-46843 | 2/1992 |
| JP | 4-49498 | 2/1992 |
| JP | 7-270541 | 10/1995 |
| JP | 10-236269 | * 2/1997 ................. 340/561 |
| JP | 9-509118 | 9/1997 |
| JP | 11-271463 | 10/1999 |
| WO | WO 9731238 | 8/1997 |

OTHER PUBLICATIONS

European Search Report issued Nov. 7, 2000 in a related application (in English).

\* cited by examiner

*Primary Examiner*—Anh La
(74) *Attorney, Agent, or Firm*—Dickstein, Shapiro, Morin & Oshinsky, LLP.

(57) ABSTRACT

A passenger detecting system includes an antenna electrode, a signal generating circuit, a detecting circuit, and a control circuit. The antenna electrode is provided in a seat to be occupied by a passenger. The signal generating circuit generates and supplies a supply signal to the antenna electrode through a resistor such that an electric field is generated around the antenna electrode. The detecting circuit includes the resistor, and detects a direct current data signal from a line voltage associated with a voltage drop across the resistor, wherein the line voltage changes depending upon an object on the seat. The control circuit determines from the detected direct current data signal, whether or not a passenger is present in the seat and whether the passenger is an adult or a child.

30 Claims, 26 Drawing Sheets

OUTPUT SIGNAL tn $T_n = t_n / t_{n\,max}$

PASSENGER DETECTING SYSTEM AND AIR BAG APPARATUS USING THE SAME

BACKGROUND OF THE INVENTION

1. Field of the Invention

The present invention relates to a passenger detecting system and an air bag apparatus. More particularly, the present invention relates to a technique for detecting the presence or absence of a passenger in a seat of an automobile and for controlling the expansion of an air bag of an air bag apparatus.

2. Description of the Related Art

Generally, an air bag apparatus is an apparatus to ease the impact which a driver and passengers receive upon collision of an automobile. The air bag apparatus has been necessary for the safety of the automobile. Recently, the air bag apparatus has been installed at the passenger side in addition to the driver's side.

For example, as shown in FIG. 1A; a first conventional air bag apparatus is composed of a driving seat side squib circuit, a passenger seat side squib circuit, an electronic acceleration sensor GS as a collision detecting sensor, and a control circuit CC. The driving seat side squib circuit includes a series circuit of a safing sensor SS1; a squib SQ1, and a switching element SW1 such as an electric field effect type transistor. The passenger seat side squib circuit includes a series circuit of a safing sensor SS2, a squib SQ2, and a switching element SW2 such as an electric field effect type transistor. The control circuit CC has a function to detect collision of an automobile in accordance with the output signal of the electronic acceleration sensor GS and to supply a signal to the gates of the switching elements SW1 and SW2.

According to the first conventional air bag apparatus, in the event of an automobile collision, the switch contacts of the safing sensors SS1 and SS2 are closed in response to the relatively small acceleration. Then, the squib circuits on the driving seat side and the passenger seat side are set to their operable states. When the control circuit CC reliably determines the collision of the automobile in accordance with the signal from the electronic acceleration sensor GS, squib control signals are supplied to the gates of the switching elements SW1 and SW2 to set to the ON state. By this, a current flows through each squib circuit. As a result, the squib circuits SQ1 and SQ2 are heated and the air bags on the driving seat side and the passenger seat side are developed, so that the driver and passenger are protected from the impact of the collision.

In the first conventional air bag apparatus, the air bag is expanded out upon collision of the automobile irrespective of whether or not a passenger is present in the passenger seat or of the size of the passenger. For example, when an adult passenger is present in the passenger seat, the passenger will be protected upon the collision as mentioned above. However, when the passenger is a child, since a child is shorter than an adult, the head position of the child is low than that of the adult. Therefore, there is a concern of injury to the child during expansion of the air bag a child, it is sometimes desirable that the air bag is not expanded even if the automobile collides.

Therefore, a second conventional air bag apparatus as shown in FIG. 1B has been proposed to cope with such a problem. In this air bag apparatus, a sensor SD is further provided to detect whether or not a passenger is present in a passenger seat. The control circuit CC determines whether or not a passenger is present in the passenger seat in accordance with a detection signal of the sensor SD, and selectively sets the air bag to either the expansion allowable state or the expansion inhibited state in accordance with the determined result.

In particular, a passenger detecting system using a weight sensor such as the sensor SD is proposed in which the determination of whether the passenger is an adult or a child is performed in accordance with the weight of the passenger as measured by the weight sensor. Also, a passenger detecting system is proposed in which an image of the passenger in the passenger seat is picked up by a camera and a determination of whether the passenger is an adult or a child is performed through image processing.

According to the former system, a rough determination of whether the passenger is an adult or a child is possible. The air bag is set to either the expansion allowable state or the expansion inhibited state in accordance with the determination result. Thus, the unexpected situation in a collision of an automobile can be avoided. However, there is a problem of a lack of accuracy, because the difference in weight between individuals is large and a child can be sometimes heavier in weight than an adult.

Also, according to the fatter system, the determination of whether or not a passenger is present in the seat, and the determination of whether the passenger is an adult or a child can be quite correctly performed. However; there is a problem in that a processor for determining the above-described information becomes complicated and expensive, because the imaging data picked up by the camera needs to be subjected to image processing and a comparing process with various image patterns.

In conjunction with the above, a passenger detecting system to detect the presence or absence of a passenger in the passenger seat are proposed in various systems. In Japanese Laid Open Patent Application (JP-A-Heisei 4-46843), Japanese Laid Open Utility Model Application (JP-U-Heisei 3-52266), Japanese Laid Open Patent Application (JP-A-Shown 61-113527), a passenger detecting system in which a weight sensor is incorporated inside the seat is disclosed. Also, Japanese Laid Open Patent Application (JP-A-Heisei 9-509118)discloses a passenger detecting system in which electrodes are arranged in a seat section and a back supporting section of a seat and an-oscillation circuit is connected between the electrodes or between the electrode and the chassis of a vehicle.

SUMMARY OF THE INVENTION

Therefore, an object of the present invention is to provide a passenger detecting system in which the presence or absence of a passenger in a seat can be accurately detected irrespective of an ambient temperature.

Another object of the present invention is to provide a passenger detecting system in which the presence or absence of a passenger in a passenger seat can be accurately detected without influence by the position of the passenger.

Still another object of the present invention is to provide an air bag apparatus which includes the above passenger detecting system and in which an air bag can be controlled in accordance with detected result.

In order to achieve one aspect of the present invention, a passenger detecting system includes an antenna electrode, a signal generating circuit, a detecting circuit, and control circuit. The antenna electrode is provided in a seat to be occupied by a passenger. The signal generating circuit generates and supplies a supply signal to the antenna electrode through a resistor such that an electric field is generated around the antenna electrode. The detecting circuit includes the resistor, and detects direct current data signal from a line voltage associated with a voltage drop by the resistor, wherein the line voltage changes depending upon an object on the seat. The control circuit determines from the detected direct current data signal, whether or not a passenger is present on the seat and whether the passenger is an adult or a child.

The passenger detecting system may further include an amplitude control circuit for detecting an amplitude of the supply signal and adjusting the amplitude to a predetermined value based on the detected amplitude. The supply signal may be an alternating current signal having a frequency of about 120 KHz and a voltage in a range of 5 to 12 V.

The detecting circuit may include a converter for converting the line voltage of alternating current into a direct current signal. In this case, the detecting circuit further includes an impedance converting circuit provided between the resistor and the converter and having a high impedance on an input side and a low impedance on an output side.

The detecting circuit may include a rectifier for rectifying the line voltage of alternating current into a direct current signal in full wave, and a smoothing circuit for producing the direct current data signal from the direct current signal.

Also, the detecting circuit may include a rectifier for rectifying the line voltage of alternating current into a direct current signal in half wave, and a smoothing circuit for producing the direct current data signal from the direct current signal. In this case, the rectifier includes an operation amplifier having an inversion terminal connected to a predetermined voltage and a non-inversion terminal connected to the line voltage.

The passenger detecting system may further include a buffer circuit provided between the resistor and the antenna electrode and having a high impedance on an input side and a low impedance on an output side.

When the signal generating circuit supplies the direct current supply signal, the detecting circuit may include a switching element connected between the resistor and a ground level for switching between an on state and an off state in response to a control signal from the control signal such that a pulse signal is supplied to the antenna electrode.

The passenger detecting system may further include a plurality of antenna electrodes; and a switching circuit provided between the resistor and the plurality of antenna electrodes, and selectively supplying the supply signal to one of the plurality of antenna electrodes in response to a switching control signal from the control circuit.

Alternatively, the passenger detecting system may further include a plurality of antenna electrodes, a plurality of circuit sets respectively provided for the plurality of antenna electrodes, each of the circuit sets including a signal generating circuit and a detecting circuit, and a switching circuit provided between the control circuit and the plurality of circuit sets, and selectively supplying the control signal to one of the plurality of circuit sets in response to a switching control signal from the control circuit.

The control circuit may: produce signal data from the detected direct current data signals corresponding to the plurality of antenna electrodes, calculate a summation of the signal data, determine, based on the summation of the signal data, whether or not a passenger is present in the seat.

Alternatively the control circuit may producesignal data from the detected direct current data signals corresponding to the plurality of antenna electrodes; calculate a summation of the signal datadeterninedetermine based on the summation of the signal data, whether or not a passenger is present in the seat; normalize each of the signal data based on a maximum one of the signal datacalculate a summation of the normalized signal datadetermine, based on the summation of the normalized signal data, whether the passenger is an adult or a child. In this case, the control circuit further calculates a gravity of the normalized signal data, and determines, based on the summation of the normalized signal data and the calculated gravity, whether the passenger is an adult or a child.

In order to achieve another aspect of the present invention, an air bag apparatus includes a passenger detecting system and an air bag control system. The passenger detecting system includes an antenna electrode, a signal generating circuit, a detecting circuit and a control circuit. The antenna electrode is provided in a seat to be occupied by a passenger. The signal generating circuit generates and supplies a supply signal to the antenna electrode through a resistor such that an electric field is generated around the antenna electrode. The detecting circuit includes the resistor, and detects a direct current data signal from a line voltage associated with a voltage drop by the resistor, wherein the line voltage changes depending upon an object on the seat. The control circuit determines from the detected direct current data signal, whether or not a passenger is present in the seat and whether the passenger is an adult or a child. The air bag control system is connected to the control circuit and sets an air bag to either an expansion allowed state or expansion inhibited state based on the determination result by the control circuit.

The air bag apparatus may further include an amplitude control circuit for detecting an amplitude of the supply signal and adjusting the amplitude to a predetermined value based on the detected amplitude. Also, the supply signal may be an alternating current signal having a frequency of about 120 KHz and a voltage in a range of 5 to 12 V.

The detecting circuit may include a converter for converting the line voltage of alternating current into a direct current signal. The detecting circuit may further include an impedance converting circuit provided between the resistor and the converter and having a high impedance on an input side and a low impedance on an output side. Further, the detecting circuit may include a rectifier for rectifying the line voltage of alternating current into a direct current signal in full wave, and a smoothing circuit for producing the direct current data signal from the direct current signal. Alternatively, the detecting circuit may include a rectifier for rectifying the line voltage of alternating current into a direct current signal in half wave, and a smoothing circuit for producing the direct current data signal from the direct current signal. In this case, the rectifier includes an operation amplifier having an inversion terminal connected to a predetermined voltage and a non-inversion terminal connected to the line voltage.

The air bag apparatus may further include a buffer circuit provided between the resistor and the antenna electrode and having a high impedance on an input side and a low impedance on an output side.

When the signal generating circuit supplies the supply signal of a direct current, the detecting circuit includes a switching element connected between the resistor and a ground level for switching between an on state and an off state in response to a control signal from the control circuit such that a pulse signal is supplied to the antenna electrode.

The air bag apparatus may further include a plurality of the antenna electrodes, and a switching circuit provided between the resistor and the plurality of antenna electrodes, and selectively supplying the supply signal to one of the plurality of antenna electrodes in response to a switching control signal from the control circuit.

Alternatively, the air bag apparatus may further include a plurality of antenna electrodes, a plurality of circuit sets respectively provided for the plurality of antenna electrodes, each of the circuit sets including a signal generating circuit and a detecting circuit, and a switching circuit provided between the control circuit and the plurality of circuit sets, and selectively supplying the control signal to one of the plurality of circuit sets in response to a switching control signal from the control circuit. In this case; the control circuit produces signal data from the detected direct current data signals corresponding to the plurality of antenna electrodes, calculates a summation of the signal data, and determines, based on the summation of the signal data, whether or not a passenger is present in the seat.

Alternatively, the control circuit produces signal data from the detected direct current data signals corresponding to the plurality of antenna electrodes, calculates a summation of the signal data, determines, based on the summation of the signal data, whether or not a passenger is present on the seat, normalizes each of the signal data based on a maximum one of the signal data, calculates a summation of the normalized signal data, and determines, based on the summation of the normalized signal data, whether the passenger is an adult or a child. In this case, the control circuit may further calculate a gravity of the normalized signal data, and determines, based on the summation of the normalized signal data and the calculated gravity, whether the passenger is an adult or a child.

DESCRIPTION OF THE PREFERRED EMBODIMENTS

Next, an air bag apparatus with a passenger detecting system of the present invention will be described below in detail with reference to the attached drawings. U.S. patent is incorporated herein by reference.

Figure 1A:
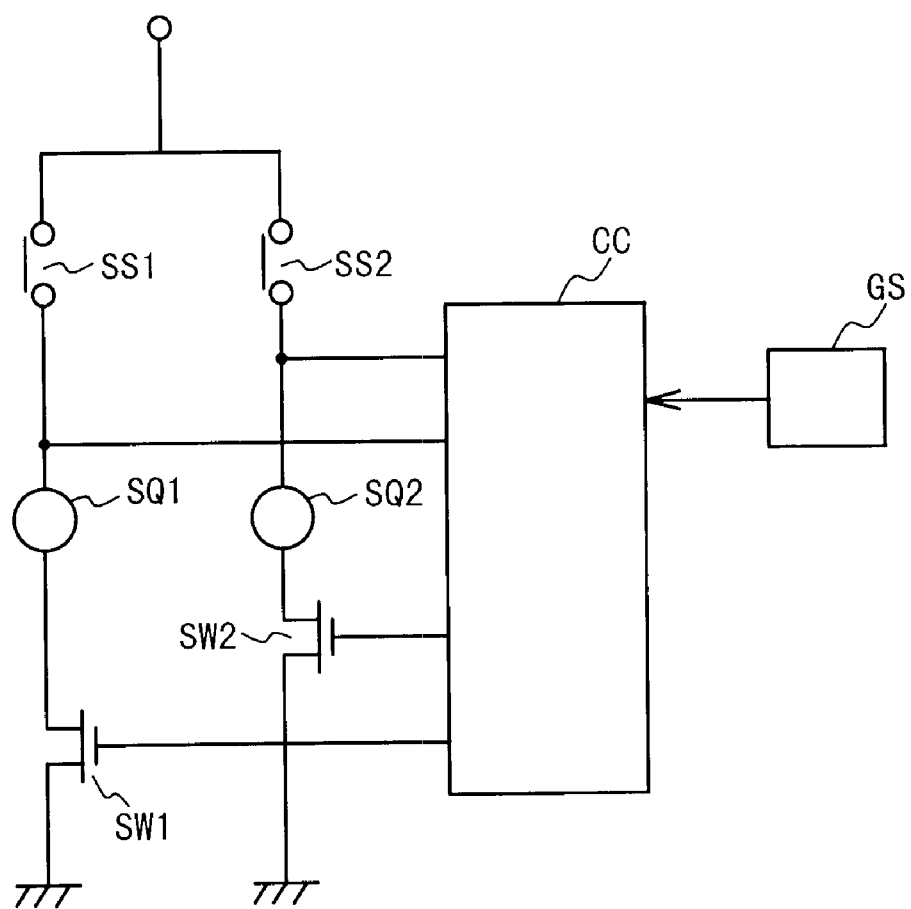
FIG. 1A is a circuit block diagram of first conventional air bag apparatus.
Figure 1B:
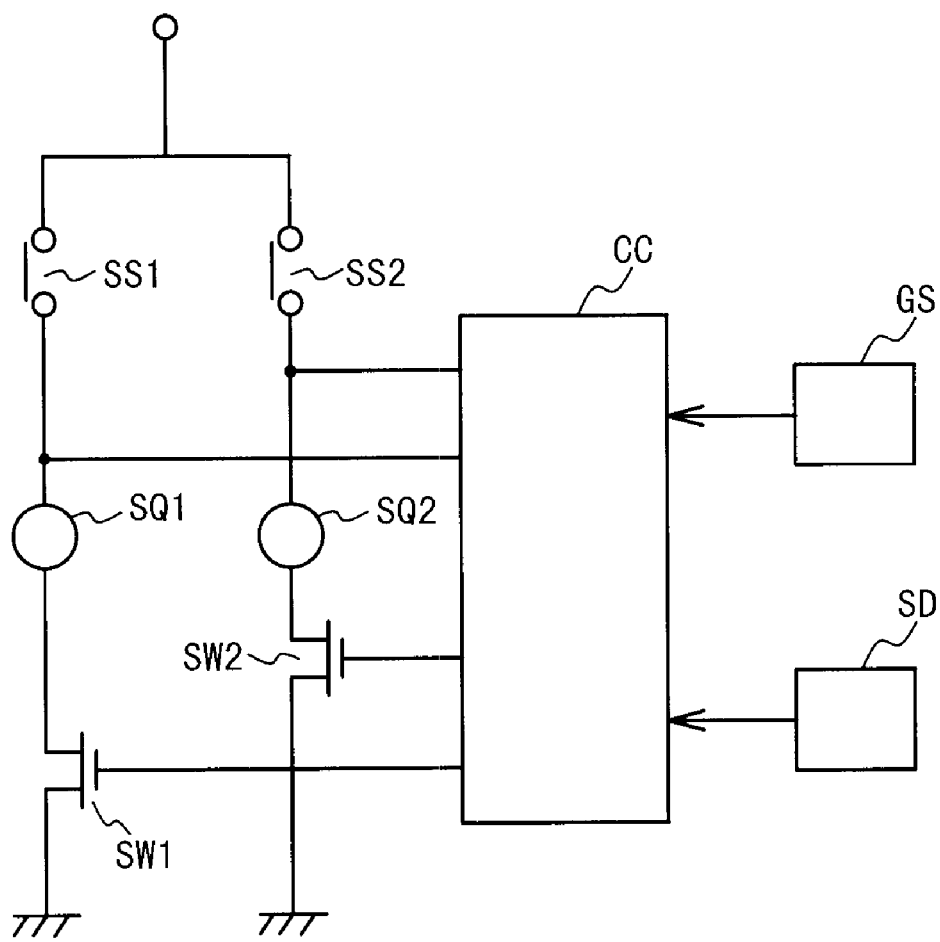
FIG. 1B is a circuit block diagram of second conventional air bag-apparatus.
Figure 2A:
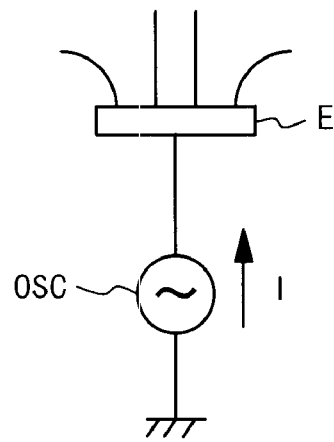
FIG. 2A is a diagram illustrating all electric field distribution around an antenna electrode.
Figure 2B:
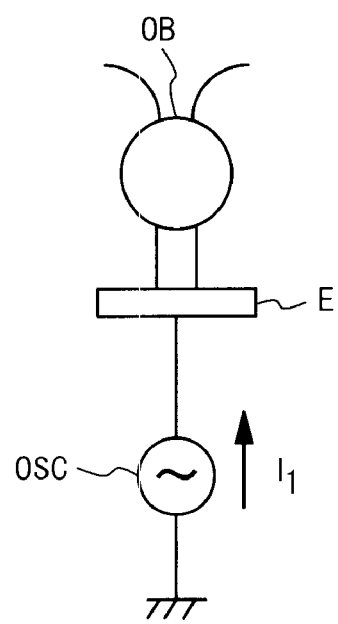
FIG. 2B is a diagram illustrating the electric field distribution when an object exists in the neighborhood of the antenna electrode.

FIGS. 2A and 2B are diagrams illustrating the principle of the present invention. Referring to FIGS. 2A and 2B, the principle of the present invention will be described.

A passenger detecting system basically utilizes the distortion of a weak electric field which is generated around an antenna electrode which is arranged in a seat. As shown in FIG. 2A, when a high frequency low voltage signal is applied from an oscillating circuit OSC to the antenna electrode E; the weak electric field is generated around the antenna electrode E. As a result, a displacement current 1 flows through the antenna electrode E. In this state, as shown in FIG. 2B, when an object OB approaches the neighborhood of the antenna electrode E, the electric field is distorted so that a displacement current I1 flows through the antenna electrode E. The displacement current I1 is different from the current I.

In this manner, the displacement current which flows through the antenna electrode E changes depending upon the present or absence of an object OB on the seat. By using this phenomenon, the presence or absence of a passenger in the seat can be detected. Also, whether the passenger in the seat is an adult or a child can be detected. Especiallyif the number of antenna electrodes is increased; it is possible to obtain a lot of data on the object or passenger in the seat, so that the presence or absence of a passenger in the seat can be more accurately detected.

Next, the air bag apparatus passenger detecting system according to a first preferred embodiment of the present invention which uses this principle will be described with reference to FIGS. 3A and 3B, FIGS. 4A and 4B, FIG. 5 and FIG. 6.

Figure 3A:
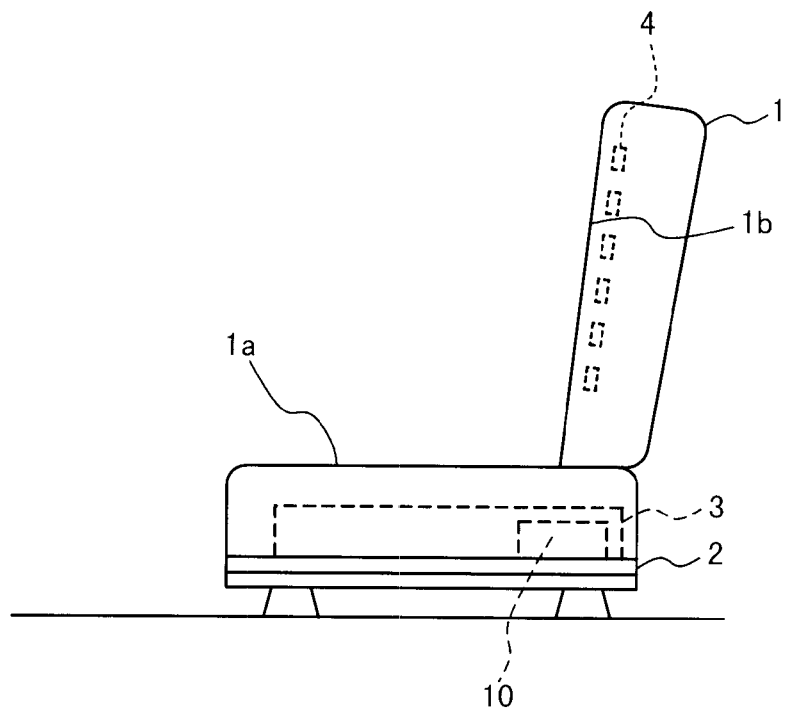
FIG. 3A is a side view of a seat illustrating the arrangement of antenna electrodes.
Figure 3B:
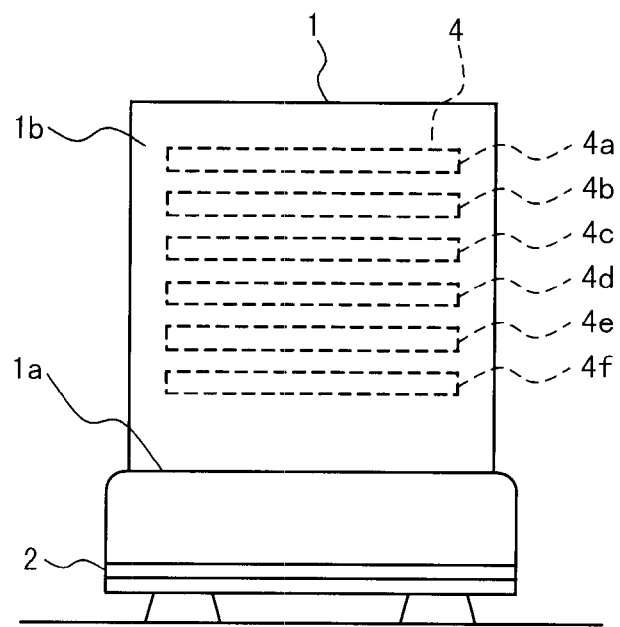
FIG. 3B is a front view of the seat.

FIGS. 3A and 3B show a, passenger seat (or a driver seat) according to the present invention. The seat 1 is mainly composed of a seat section 1a and a back supporting section 1b. For example, the seat section 1a is composed of a base 2 slidable in the front and back directions; a seat frame 3 fixed on the base 2; a cushion material arranged on the seat frame 3 and an exterior material covering the cushion material. The back supporting section 1b is composed of a cushion material arranged on the front side of the seat frame and an exterior material covering the cushion material.

Figure 4A:
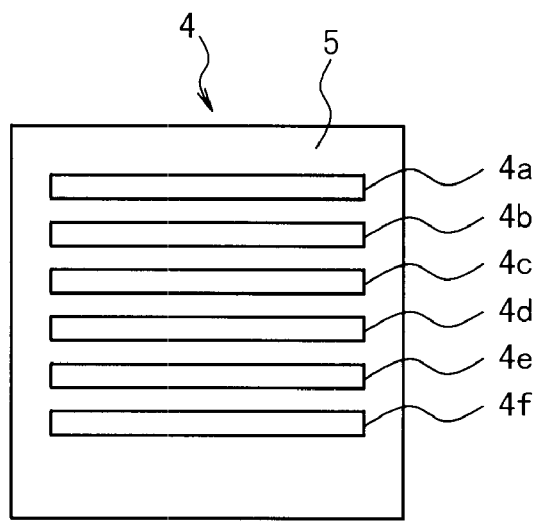
FIG. 4A is a plan view of an antenna electrode section.
Figure 4B:
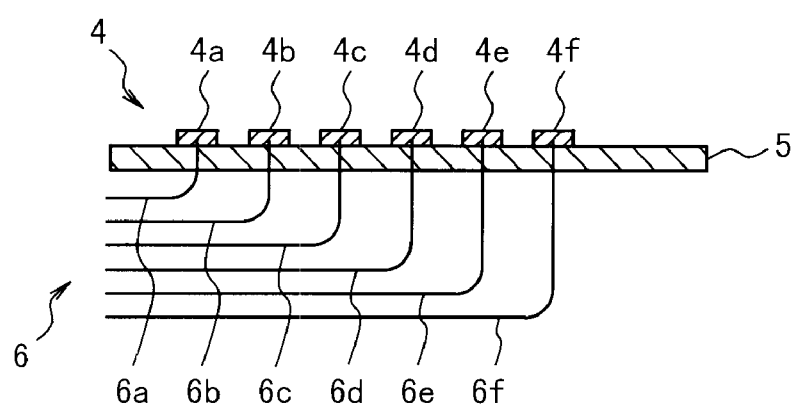
FIG. 4B is a cross sectional side view of the antenna electrode section.
Figure 5:
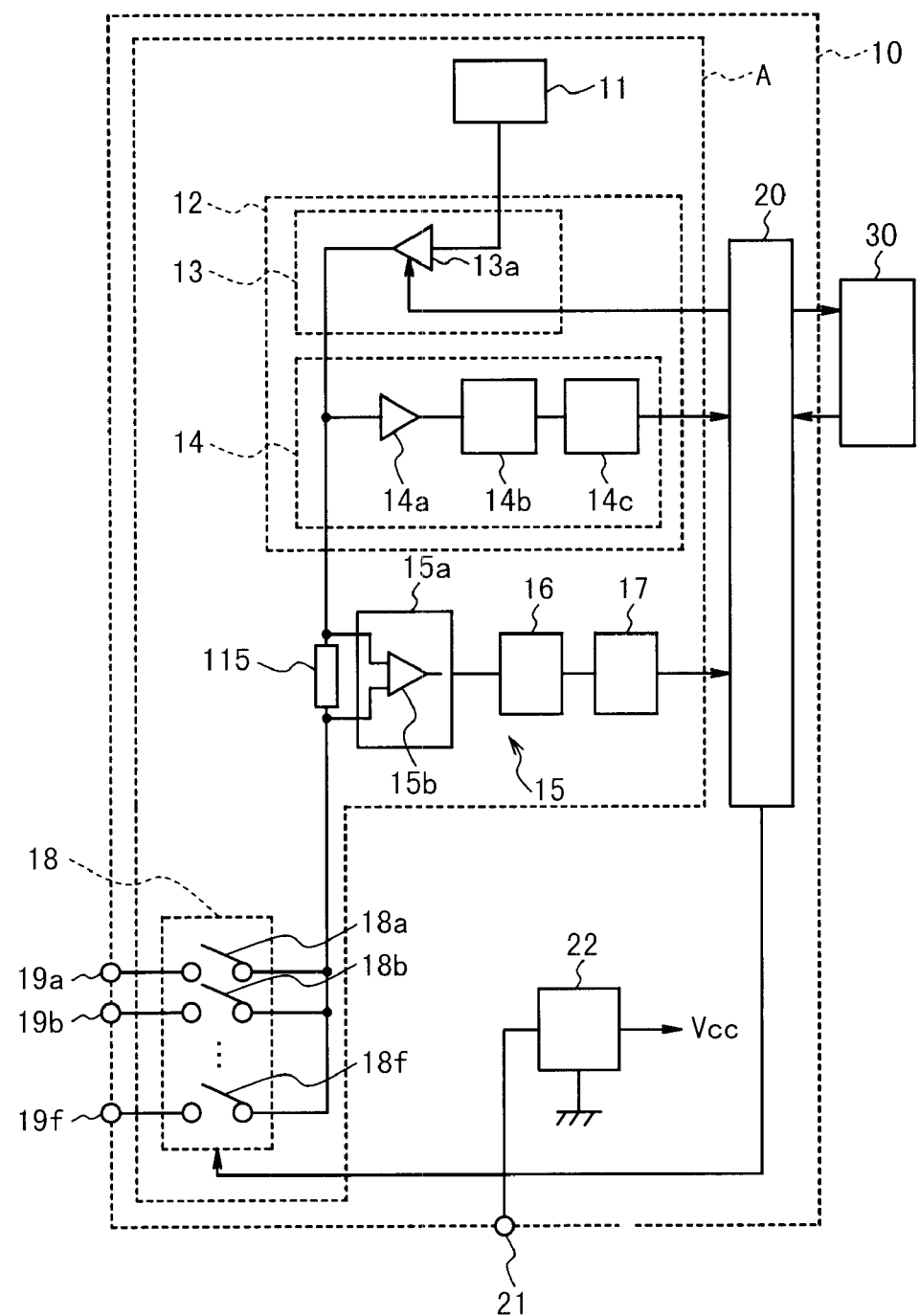
FIG. 5 is a circuit block diagram of a passenger detecting system according to a first embodiment of the present invention.

As shown in FIGS. 3B, 4A and 4B, an antenna electrode section 4 is arranged in the back supporting section 1b. The antenna electrode section 4 is composed of a plurality of band-shaped antenna electrodes 4a to 4f and a base member 5. That is, the plurality of band-shaped antenna electrodes 4a to 4f are arranged to extend on the base member 5 in a horizontal width direction of the back supporting section 1b and spaced apart from each other in a vertical direction it should be noted that the antenna electrode section 4 may be provided inside the exterior material or outside the exterior material. Also, the antenna electrode section 4 may be incorporated in the exterior material. Also, a control unit to be described later is arranged on the seat frame 3 or in the neighborhood of the seat frame 3, as shown in FIG. 3A.

In this embodiment, the plurality of antenna electrodes 4a to 4f are composed of conductive cloth. However, the antenna electrodes 4a to 4f may be woven into the seat cloth back supporting section 1b as metal thread resistor 115 as an impedance element, detecting circuit 1;5a including an amplifier 15b, an AC-DC converting circuit 16 and an amplifier 17. The resistor 115 is connected with the amplitude control circuit 12 in series. Also, the output side of the resistor 115 of the current detecting circuit 15 is connected with the connectors 19a to 19f through the switches 18a to 18f of the switching circuit 18. The amplifier 15b of the detecting circuit 15a is a differential amplifier which amplifies a voltage between terminals of the resistor 115 to detect a current of the high frequency low voltage signal to output a detection signal. The AC-DC converting circuit 16 converts the detection signal from the detecting circuit 15a into a direct current signal. The amplifier 17 amplifies the direct current signal supplied from the AC-DC converting circuit 16 to output to the control circuit 20 as a current detection signal. The switching circuit 18 for the antenna electrodes 4a to 4f is connected between the current detecting circuit 15 on the one side and the connector 19a to 19f on the other side; and has a plurality of switches 18 (18a to 18f). It should be noted that the selective switching between the switches 18a to 18f of the switching circuit 18 is performed in accordance with a switching control signal from the control circuit 20.

The passenger detecting system formed in this way operates as follows.

First, when the high frequency low voltage signal is transmitted from the oscillating circuit 11, the voltage amplitude of the high frequency low voltage signal is detected by the detecting section 14a of the amplitude detecting circuit 14. A detection signal from the detecting section 14a is converted into the direct current signal by the AC-DC converting circuit 14b, and is amplified by the amplifier 14c and then is supplied to the control circuit 20 as the amplitude detection signal. The control circuit 20 determines whether or not the detected voltage amplitude is set to the predetermined amplitude value. Then; the control circuit 20 outputs the amplitude control signal to the amplitude changing section 13a such that the voltage amplitude is corrected or adjusted to predetermined amplitude value. By this, the amplitude value of the high frequency low signal is corrected to the predetermined amplitude value. Thereafter, through the cooperation operation of amplitude variable circuit 13 and the amplitude detecting circuit 14, the amplitude value of the high frequency low voltage signal is controlled to the constant amplitude value.

The high frequency low voltage signal having the predetermined amplitude value is supplied to the antenna electrodes 4a to 4f through the current detecting circuit 15, the switching circuit 18, and the connectors 19a to 19f. As a result, a weak electric field is generated around the antenna electrode. At this time, the switches 18a to 18f of the switching circuit 18 perform the control of the opening and closing operation in response to a switching control signal from the control circuit 20.

More specifically, first, only the switch 18a is closed, and next only the switch 18b is closed. In this manner, a specific one of the switches 18a to 18f) is closed. At the same time the switching control is performed such that the remaining switches other than the closed switch are opened. Therefore, when a specific one of the switches 18a to 18f is closed, the high frequency low voltage signal is supplied to one of the antenna electrodes 4a to 4f corresponding to the 25 specific switch. As a result, a weak electric field is generated around the corresponding one of the antenna electrodes 4a to 4f, and the current flows with a level determined in accordance with a passenger on the passenger seat 1. That is, the current flows in accordance with a contact area with body portions of the passenger such as the back; the shoulder, the neck, and the head. This current is detected by the current detecting circuit 15, is converted into the direct current signal by the AC-DC converting circuit 16, and is amplified by the amplifier 17 and then is supplied to the control circuit 20 as signal data one after another.

The control circuit 20 is composed of a storage section, a memory section, a calculating section and a determining section. The storage section stores the signal data outputted from the interface circuit A. The calculating section adds the signal data from the current detecting circuit 15. Also, the calculating section performs a normalizing process to the signal data in accordance with a maximum one of the signal data, and a summing process and a gravity calculating process. Threshold values are previously stored in the memory section. In particular, in the memory section are previously stored a threshold value The used to determine whether or not the passenger seat is empty, and first and second threshold values TH1 and TH2 used to determine whether the passenger is an adult or a childa signal data outputted from the interface circuit A relates to the current flowing through the antenna electrode when the child or adult sits in the seat. The threshold data THe is specifically set to "20". A passenger is determined to be present in the seat 1 if the summation S is equal to or larger than "20", and it is determined that no passenger is present in the seat 1 if the summation S is smaller than "20".

Figure 7A:
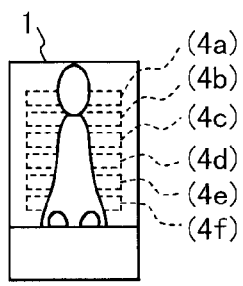
FIG. 7A is a state when a child is present on the seat.
Figure 7B:
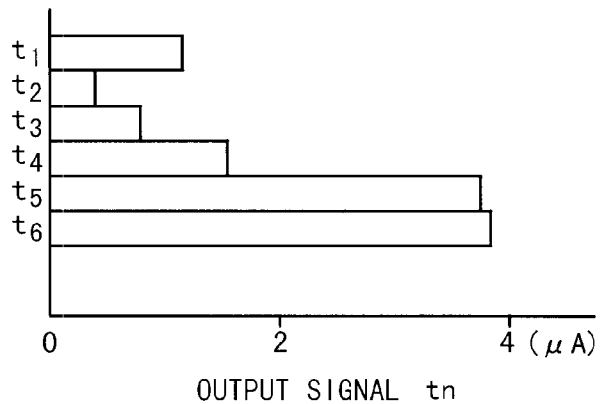
FIG. 7B is a signal data pattern relating to current flowing through each antenna electrode in the state shown in FIG. 7A.

The levels of the current flowing through the antenna electrodes 4a to 4f are different from each other in accordance with the contact areas between the antenna electrodes in the seat and the body portions of the passenger such as 25 the head, the neck, the shoulder and the back. Also, the patterns of current levels are different between a child and an adult. Therefore, the threshold data TH1 used to distinguish the passenger is set in accordance with the above facts. That is, as shown in FIGS. 7A and 7B, when the passenger is a child, the current levels corresponding to the body portions of the passenger such as the shoulder or portions lower than the shoulder takes on higher values in the order. Also, current level for the antenna or electrode 4a corresponding to the head of the passenger takes on a higher value, and the current level for the antenna electrode 4b corresponding to the neck of the passenger takes on the lowest value.

Figure 8A:
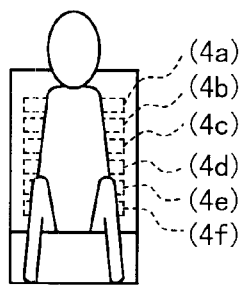
FIG. 8A is a state when an adult is present on the seat.
Figure 8B:
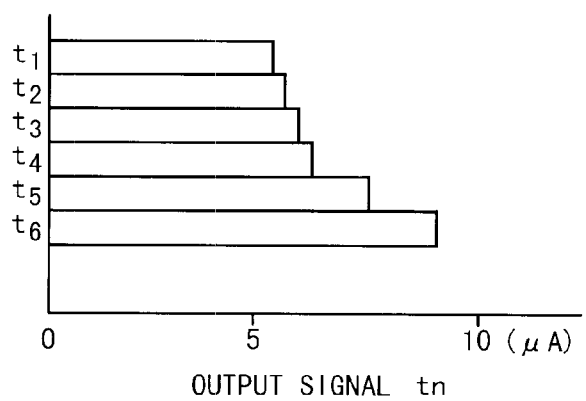
FIG. 8B is a signal data pattern relating to current flowing through each antenna electrode in the state shown in FIG. 8A.

On the other hand, as shown in FIGS. 8A and 8B, when the passenger is an adult, there is no antenna electrode corresponding to the head of the passenger. Also, the current levels for the antenna electrodes 4a to 4f corresponding to the body portions of the passenger such as the shoulder of the passenger or portions lower than the shoulder become higher in order.

Figure 7C:
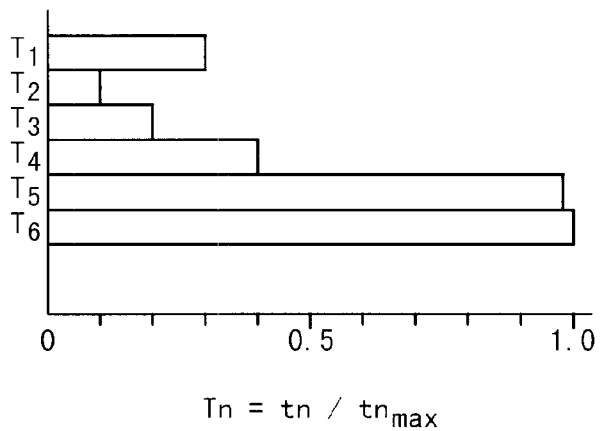
FIG. 7C is a diagram illustrating a distribution pattern of normalized data.
Figure 7D:
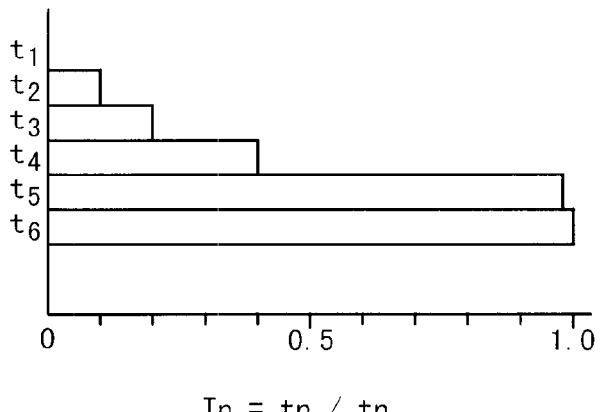
FIG. 7D is a diagram illustrating modification of the distribution pattern of normalized data.
Figure 8C:
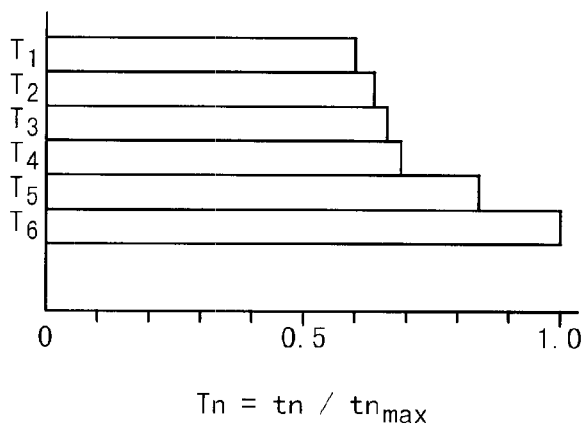
FIG. 8C is a diagram illustrating a distribution pattern of normalized data.

The current which flows through the antenna electrode is influenced depending upon the and the thickness of a wear of the passenger and the position of the passenger. In order to eliminate such influence, the respective signal data relating to the levels of the current flowing through the antenna electrodes are normalized in accordance with the maximum one of the respective signal data, as shown in FIG. 7C and FIG. 8B. The summation ST of the normalized data changes depending upon the position of the passenger. Therefore, the first threshold data TH1 is determined as a value between the summations ST of the normalized data for the adult and for the child. Thus, the passenger is determined to be an adult when an actual summation ST is higher than the first threshold value TH1, and the passenger is determined to be a child when the actual summation ST is lower than the first threshold value TH1. As shown in FIG. 7D and FIG. 8C, a pattern current levels flowing through the plurality antenna electrodes is different between the adult and the child, and there is a significant difference in gravity P between the adult and the 20 child. The second threshold value TH2 used to distinguish the passenger is determined in accordance with the gravity P. It should be noted that the gravity P is calculated from the equation of (P=X/Y) using the normalized data Tn, where $X=1\times T1+2\times T2+ \ldots +(n-1)\times Tn-1+n\times Tn$ and $Y=T1+T2+ \ldots +Tn-1+Tn$.

Therefore, the passenger is determined to be an adult when an actual gravity P is larger than the second threshold value TH2, i.e., when the gravity P is positioned at a point close to the back of the passenger. Also, the passenger is determined to be a child when the actual gravity P is smaller than the second threshold value TH2, i.e., when the gravity P is positioned at a point away from the back of the passenger. According to the normalized data shown in FIGS. 7A to 8C, the data of the gravity P is 3.9 for the adult and is 5.0 for the child. Therefore, second threshold value TH2 is set to about 4.4. It should be noted that the head data may be previously removed in the determining process as shown in FIG. 7D. This is because the head position is unstable when a child is present in the seat. With the first threshold value TH1, the same may be applied.

In this manner, the actual signal data relating to the levels of current flowing through the plurality of antenna electrodes 4a to 4f are input into the control circuit and are subjected to various calculating processes. For example, the summation S of the signal data to is compared with the threshold data THe, and it is determined whether or not the seat 1 is empty. Also, each signal data to is normalized in actual gravity P is larger than the second threshold value TH2, i.e., when the gravity P is positioned at a point close tot he back of the passenger. Also, the passenger is determined to be a child when the actual gravity P is smaller that the second threshold value TH2. I.e., when the gravity P is positioned at a point away from the back of the passenger. According to the normalized data shown in FIGS. 7A to 8C, the data of the gravity P is 3.9 for the adult and is 5.0 for the child. Therefore, the second threshold value TH2 is set to about 4.4. It should be noted that the head data may be previously removed in the determining process as shown in FIG. 7D. This is because the head position is unstable when a child is present in the seat. With the first threshold value TH1, the same may be applied.

In this manner, the actual signal data relating to levels of a current flowing through the plurality of antenna electrodes 4a to 4f are input into the control circuit 20 and are subjected to various calculating processes. For example, the summation S of the signal data tn is compared with the threshold data THe, and it is determined whether or not the seat 1 is empty. Also, each signal data tn is normalized in accordance with the maximum one tnmax of the signal data tn. In FIG. 7disabled from expanding during an accident when during an accident the passenger is an child. It should be noted that the air bag on the side of the driver seat is enabled to expand irrespective of the state of the air bag on the side of the passenger seat.

Next, the main processflow of this passenger detecting system will be described with reference to FIG. 9 to FIG. 13.

Figure 9:
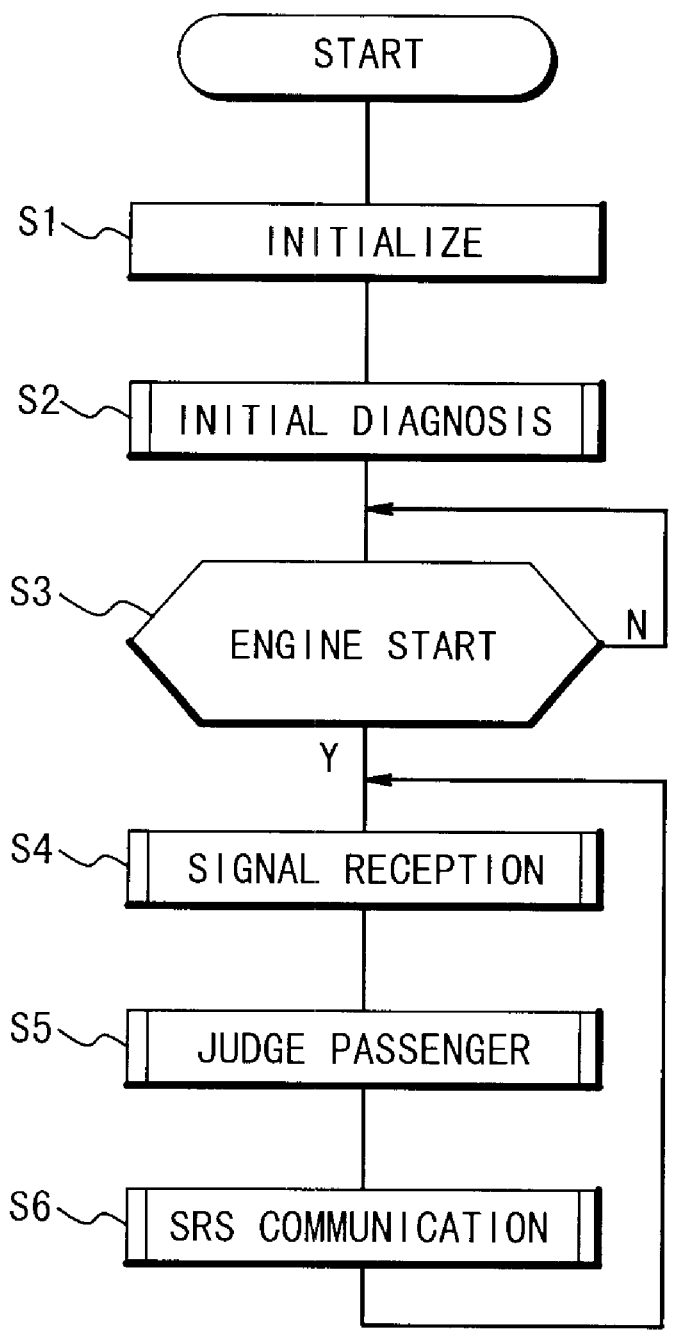
FIG. 9 is a flow chart of a passenger detecting process in the passenger detecting system according to the first embodiment of the present invention.

First, as shown in FIG. 9, an ignition switch is turned on and the main process is started. An initializing process is performed in a step S1 and the process advances to a step S2. In step S2, an initial checking or diagnosing process is performed to a communication system between the control circuit 20 and the air bag control system 30. Whether or not an engine has been started is determined in determined in a step S3. When the engine is determined not to have been started, the control executes step S3 again. In a step S4, a signal data relating to the current flowing in accordance with a weak electric field is selectively received by the control circuit 20 through the interface circuit A. The weak electric field is selectively generated in the neighborhood of each of the plurality of antenna electrodes 4a to 4f. In a step S5, the obtained data are subjected to a calculating process and the determination of whether a passenger is present in the passenger seat, and the determination of whether the passenger is a child or an adult are performed in accordance with the calculated data result. Moreover, in step S6, an SRS communication is performed between the air bag control system (SRS) 30 and the control circuit 20 in accordance with the determination results obtained in step S5. When step S6 step S4 to again, and the process from step S4 to step S6 repeatedly performed. It should be noted that step S3 can be omitted.

Figure 10:
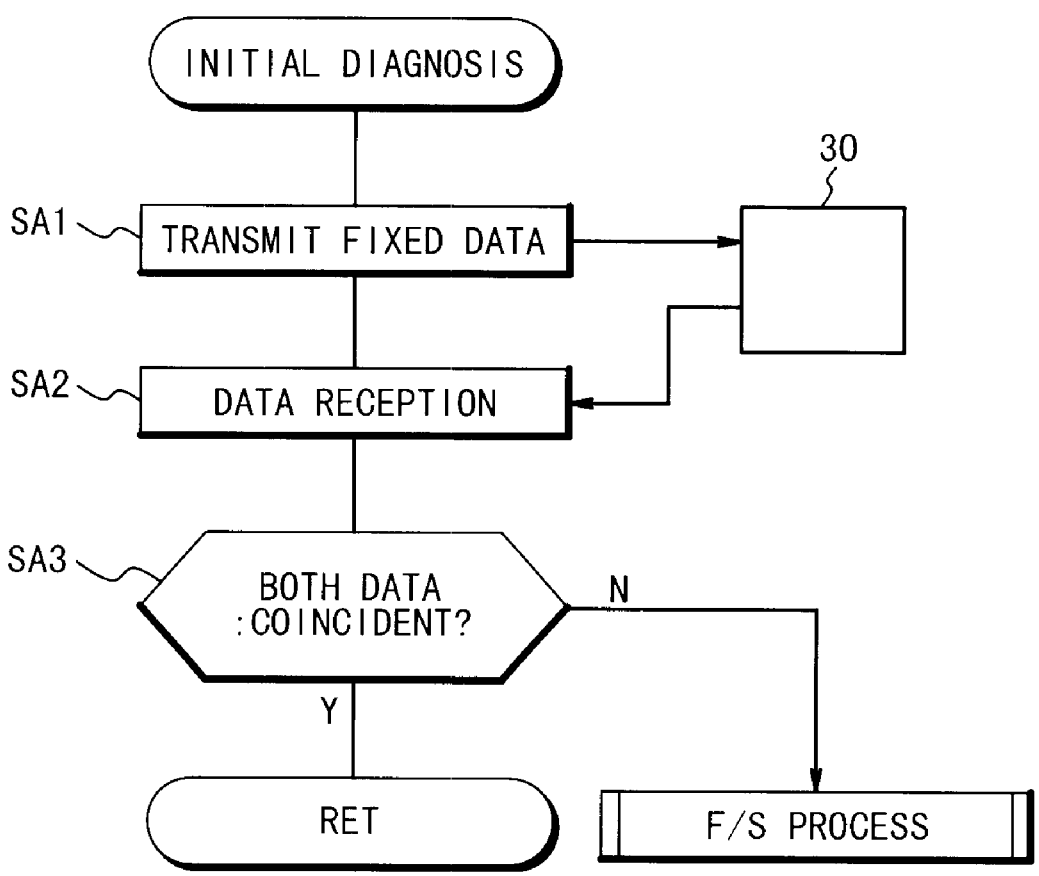
FIG. 10 is a flow chart of an initial diagnosing process of the passenger detecting process shown in FIG. 9.
Figure 11:
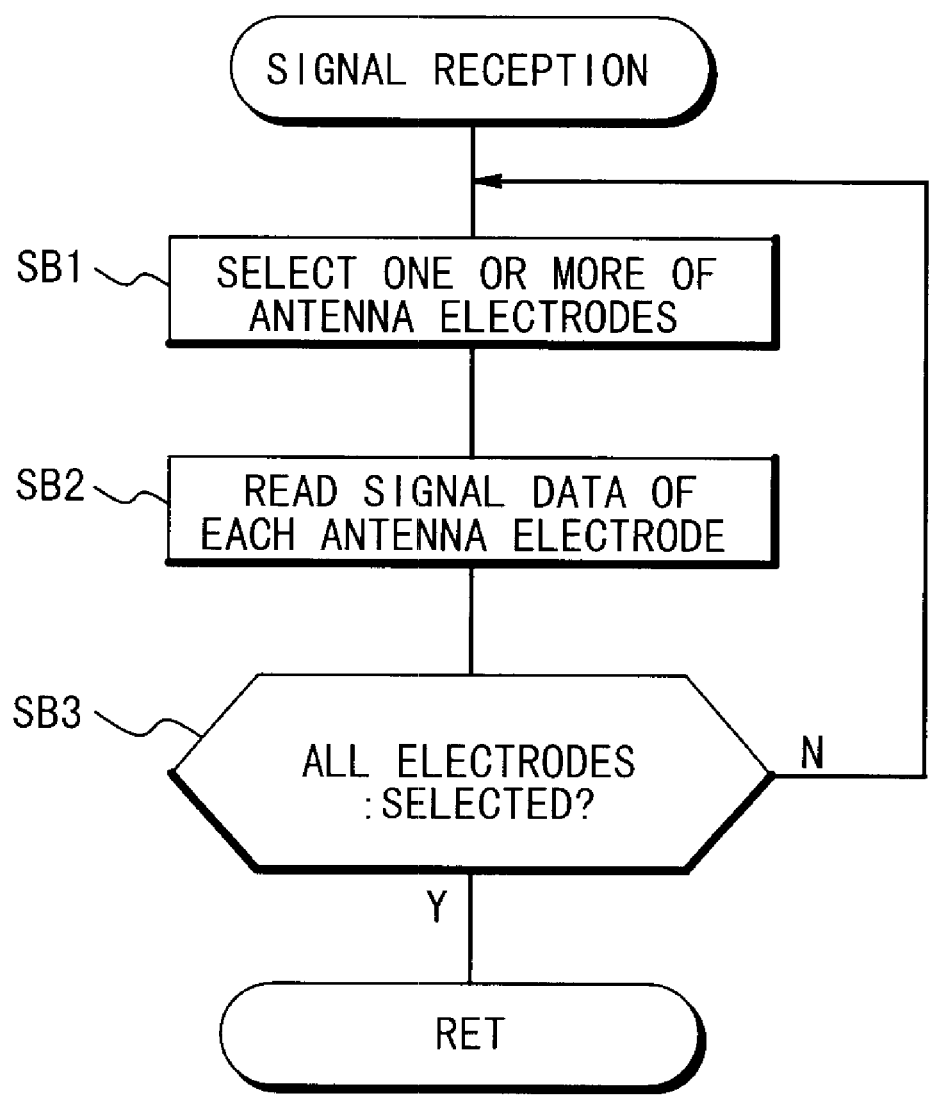
FIG. 11 is a flow chart of a signal receiving process of the passenger detecting process shown n FIG. 9.

For example, the initial diagnosing process shown as step S2 in FIG. 9 is shown in more detail FIG. 10. First, in a step SA1, a predetermined data is transmitted from the control circuit 20 to the control circuit CC of the air bag control system 30. In step SA2, data transmitted from the air bag control system 30 is received. In step SA3, it is determined whether the predetermined data which has been transmitted from the control circuit 20 to the air bag control system 30 and the data received from the air bag control system 30 are coincident with each other. When the data are determined to be coincident with each other, the main process is continued. When the data are determined not to be coincident with each other, it is determined to be an error in the communication system and a fail safe processing is performed. For example, a warning light or the like is activated step S4 of FIG. 9 is performed as shown in FIG. 11. First, in step SB1, the switches 18a to 18f of the switching circuit 18 are selectively closed one by one in order in accordance with the switching control signal from the control circuit 20 such that the antenna electrodes 4a to 4f are sequentially selected. In step SB2, the signal data t1 to t6 relating to the levels of current flowing through the respective antenna electrodes 4a to 4f are obtained by the control circuit 20. Then, the process advances to step SB3.

In step SB3, whether or not all the antenna electrodes 4a to 4f are connected in order is determined in accordance with the selective closing operation of the switches 18. When it is determined that signal data has been obtained for all of the switches to the passenger determining process. When it is determined that not signal data has not been obtained for all of the switches returns to step SB1.

Figure 12:
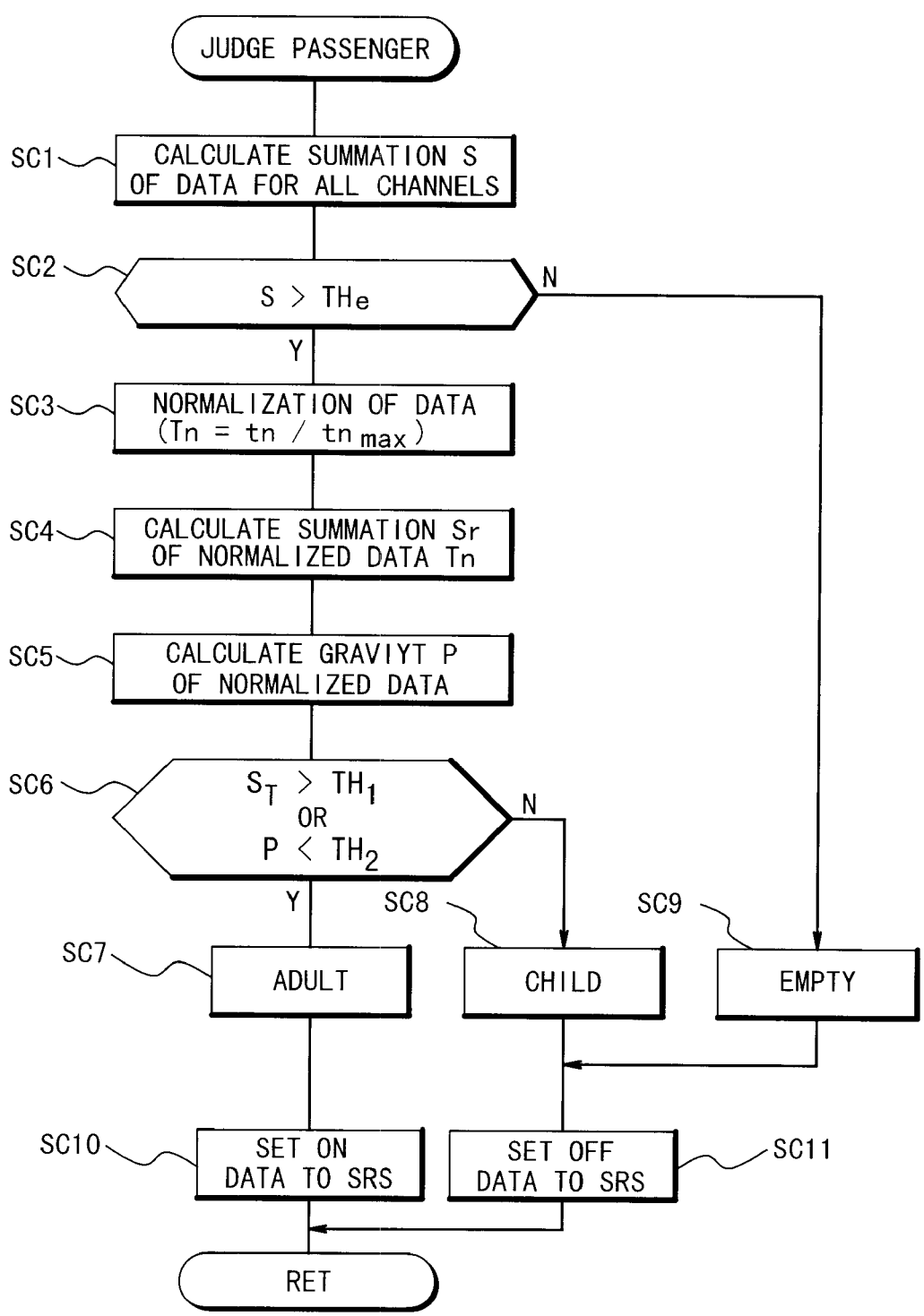
FIG. 12 is a flow chart of the passenger judging process of the passenger detecting process shown in FIG. 9.

The passenger determining process shown as step S5 in FIG. 9 is performed as shown in FIG. 12. First, in step SC1, there is calculated the summation S of the signal data to (n=1 to k). In this case, a summation of six signal data t1 to t6 for the antenna electrodes 4a to 4f is calculated. In step SC2, the summation S is compared with the threshold data THe to distinguish whether or not the summation S is larger than the threshold data THe, i.e., whether or not the seat is empty. When the summation S is determined to be larger than the threshold data THe, the process advances to step SC3. When the summation S is determined to be not larger than THe advances to step SC9 step SC3, the signal data tn (=t1 to t6) are respectively normalized in accordance with the maximum data tnmax (t6 is the maximum value as illustrated in the figures advances to step SC4. In step SC4, the summation ST of normalized data Tn is calculated. In step SC5, the gravity P is calculated from the equation using the normalized data Tn, and then the process advances to step SC6.

In step SC6, whether or not the summation ST is equal to or larger than the threshold value TH1 and/or whether or not the gravity P is less than the second threshold value TH2 are determined. The process advances to step SC7 when it is determined that the summation ST is equal to or larger than the threshold value TH1 or the gravity P is less than the second threshold value TH2 advances to step SC8 when it is determined that the summation ST is smaller than the threshold value TH1 than the first threshold value TH2 step SC7, the passenger is determined to be an adult in accordance with the determination result in step SC6. When the passenger is determined to be an adult in step SC6 step SC10 to enable the expansion of the air bag of the air bag control system 30. Then, the SRS data communication flow is continued. When the passenger is determined to be a child in step SC8, an OFF data is set in step SC11 such that the air bag of the air bag control system 30 is disabled from expanding is continued the threshold value THe, the seat is determined to be empty in step SC9 and the process advances to step SC11. Alternatively may advance to step SC10.

Figure 13:
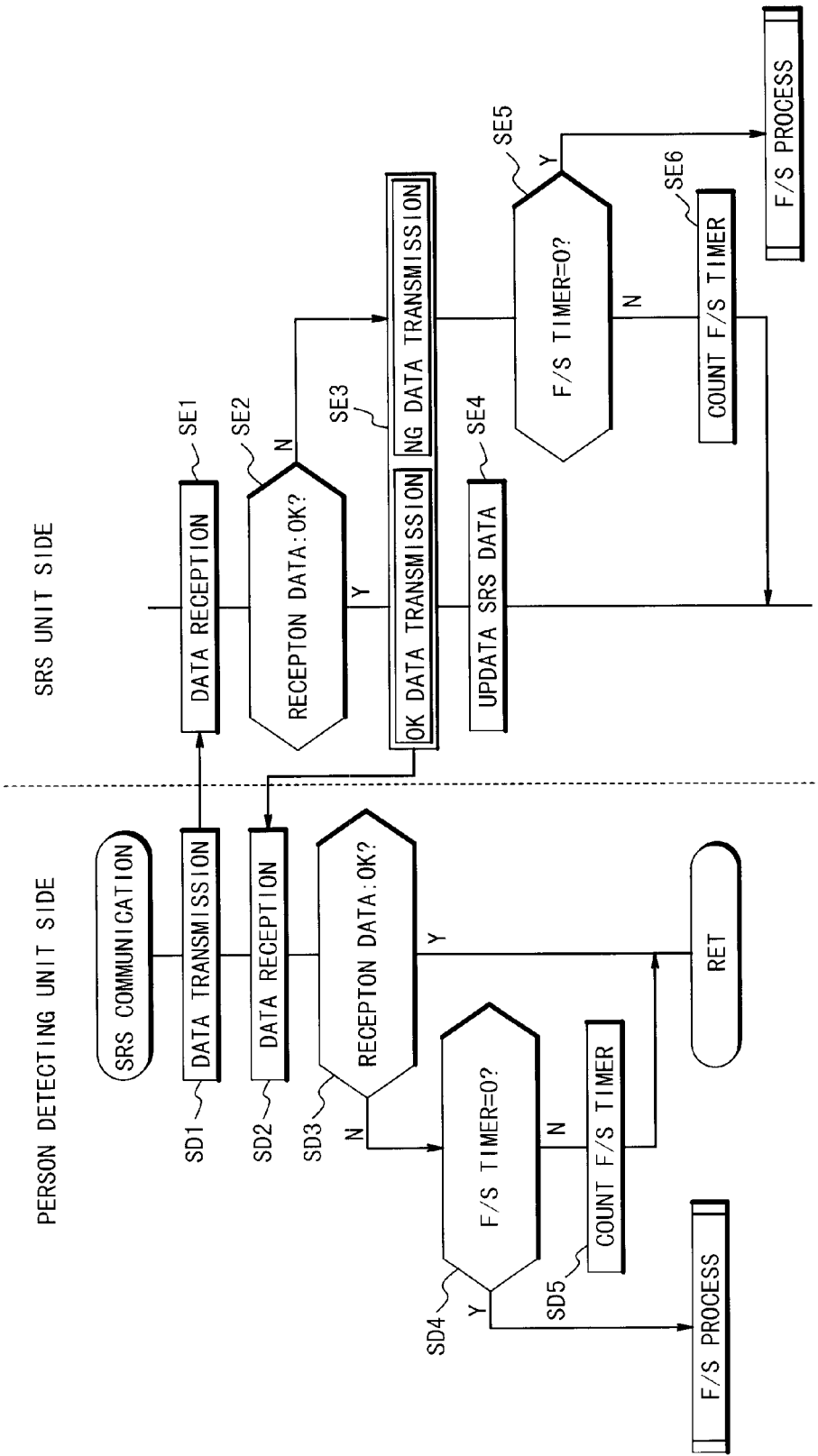
FIG. 13 is a flow chart of an SRS communication process of the passenger detecting process shown in FIG. 9.

The SRS data communication in FIG. 9 is performed as shown in FIG. 13. First, in step SD1, the ON data or OFF data and a check data are transmitted from the control circuit 20 to the control circuit CC of the air bag control system 30. As a result, the air bag of the air bag control system 30 is set to either of the expansion allowed state or the expansion inhibited state. In step SD2, an OK data or NG data and the check data for the ON data or the OFF data from the side of the air bag control system 30 are received. Next step SD3.

In step SD3, it is determined whether or not the ON/OFF data and the check data which have been transmitted from the passenger detecting system to the air bag control system 30 is sent back in the normal condition from the air the passenger detecting unit again. When it is determined that the data is normal, i.e., there is not any error in the communication system, the main process is continued. When it is determined that an error has occurred in the communication system, the process advances to step SD4 where it is determined whether or not the failsafe timer is zero. It should be noted that the error detecting operation in this communication system is executed three times, for example. Therefore, when the failsafe counter is determined to be "0", a failsafe process is performed, e.g., to light up a warning lamp. Also, when the failsafe counter is determined to be not "0", the process advances to a step SD5. The counting down process of the failsafe counter is performed and the main process is continued.

On the other hand, in step SE1, the control circuit CC of the air bag control system 30 receives the ON data or OFF data and the check data from the control circuit 20 of the passenger detecting system. In step SE2, the receive data is checked to determine whether or not the above data are normally received. Then, the process advances to step SE3. In step SE3, the OK data or NG data and the check data are transmitted from the control circuit CC of the air bag control system 30 to the control unit 10 of the passenger detecting system.

When it is determined that no error has occurred in the communication system in step SE2, the process advances to step SE4 via the transmission of the OK data in step SE3. In step SE4, data is updated on the side of the air bag control system 30 in accordance with the OK data. By this, the air bag is updated to either the expansion allowed state or the expansion inhibited state.

Also, when it is determined than an error has occurred in the communication system in step SE2, the process advances step SE5 via the transmission of the NG data in step SE3. In step SE5, it is determined whether or not the failsafe counter is "0". It should be noted that the error detecting operation in this communication system is set to 3. Therefore, when the failsafe counter is determined to be "0", a failsafe process is performed, e.g., to light up a warning lamp. Also, when the failsafe counter is determined not to be "0", the control advances to step SE6. In step SE6, the count down process of the failsafe timer is performed and then the main process is continued.

According to this embodiment, the current flows through each of the plurality of band-shaped antenna electrodes 4a to 4f depending upon the contact area of the antenna electrodes and the body portions of the passenger on the seat 1 such as the head, neck, shoulder and back of the passenger. Moreover; a pattern of current levels is distinguishable between an adult and a child. The signal data relating to each current level is normalized in accordance with the maximum one tnmax of the signal data tn and the summation ST of normalized data is compared with the first threshold value TH1. Therefore, whether the passenger is an adult or a child is correctly determined.

Also, each signal data to taken in by the control circuit 20 has the distinguishable current level pattern depending upon whether the passenger is an adult or a child. Therefore, the signal data tn is normalized in accordance with the maximum one tnmax of the signal data tn and the gravity P of the signal data is calculated from the normalized data Tn. Thus, the gravity P is compared with the second threshold value TH2. Therefore, whether the passenger is an adult or a child is correctly determined.

In particular adult or a child is determined in accordance with whether or not the summation of the normalized data ST and the gravity P of the normalized data satisfy the relations of (ST>TH1) and (P<TH2), the precision of the determination can be improved.

Further, the signal data tn taken from the interface circuit into the control circuit 20 is normalized in accordance with the maximum signal data tnmax of the signal data. Therefore, an accurate determination can be expected with high reliability and without any influence by a change in the absolute value of each output signal depending upon the wear, the figure and so on of the passenger. Therefore, the air bag of the air bag control system 30 can be reliably set to either the expansion allowed state or the expansion inhibited state in accordance with the correct passenger determination. Thus, undesired expansion of the air bag can be prevented.

Figure 14:
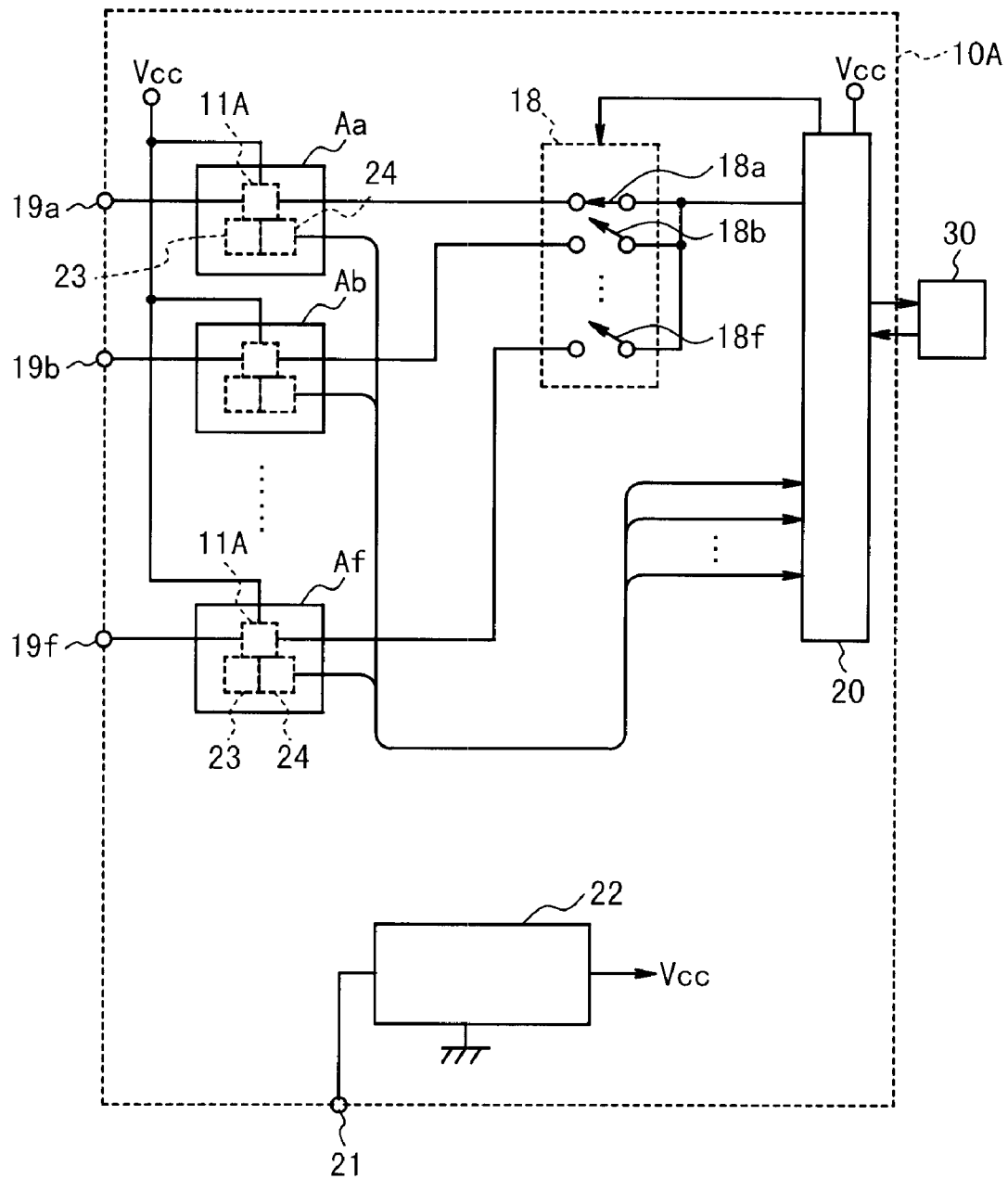
FIG. 14 is a circuit block diagram illustrating a second embodiment of the passenger detecting system according to the present invention.
Figure 20:
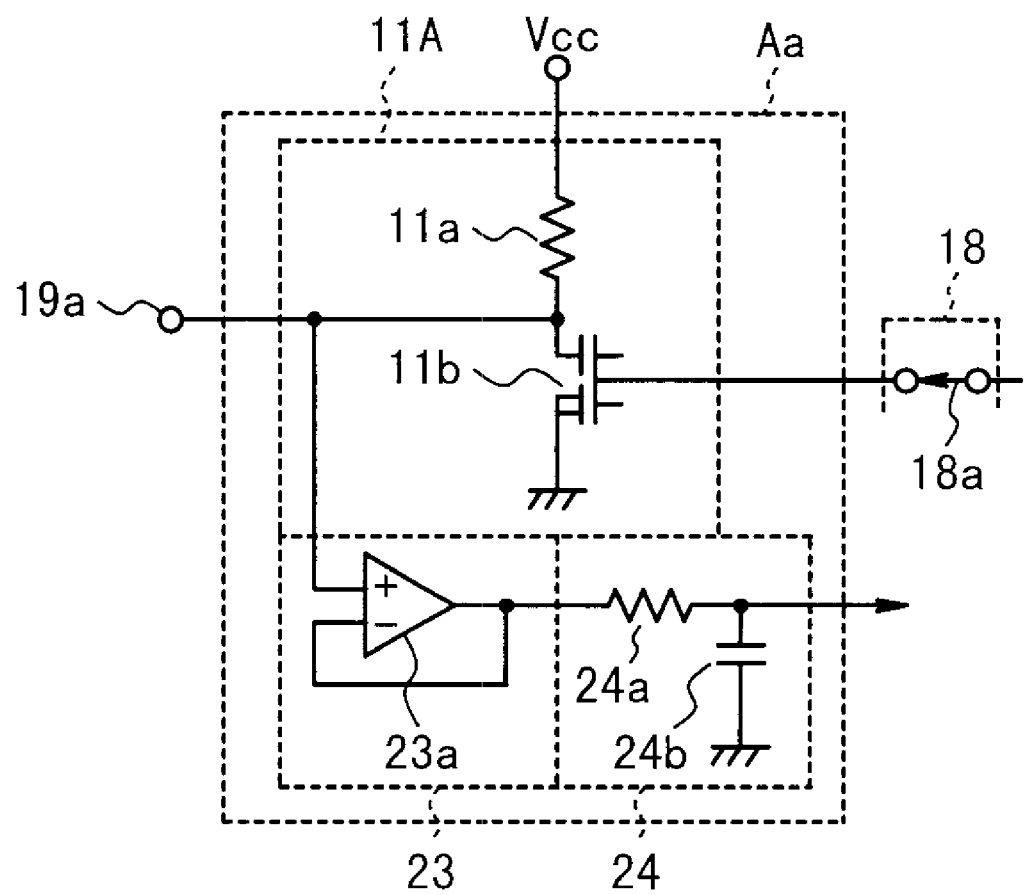
FIG. 20 is a circuit diagram illustrating an interface circuit of the passenger detecting system according to the second embodiment of the present invention.

FIG. 14 and FIG. 20 show the passenger detecting system according to a second preferred embodiment of the present invention. The control unit 10A is arranged in the seat frame 3 or in the neighborhood of the seat frame 3 like in the first embodiment. The control unit 10A is composed of the switching circuit 18 having the switches 18a to 18f, a plurality of interface circuits Aa to Af, a control circuit 20 and a power supply circuit 22. The switching of the switches 18a to 18f of the switching circuit 18 is performed in response to a signal from the control circuit 20. By this, a gate signal is selectively supplied to one of the interface circuits Aa to Af. The connectors 19a to 19f are connected to the high frequency low voltage signals of the interface circuit Aa to Af, respectively. The antenna electrodes are connected to the connectors 19a to 19f by the use of lead lines, as in the first embodiment. Also, the outputs of the interface circuit Aa to Af are connected to the control circuit 20. It should be noted that the air bag control system 30 is connected to the control circuit 20 as in the above-described first embodiment.

In the control unit 10A, the plurality of interface circuits Aa to Af have the same structure, as shown in FIG. 14. The interface circuit Aa is composed of an oscillating circuit 11A, an impedance converting circuit (buffer circuit) 23 and an AC-DC converting circuit 24. The impedance converting circuit 23 is connected to the high frequency low voltage signal of the oscillating circuit 11A, to perform an impedance converting process. The AC-DC converting circuit 24 converts the output signal of the impedance converting circuit 23 into a direct current signal.

As shown in FIG. 20, in the above-mentioned interface circuit Aa, the oscillating circuit 11A has a resistor 11a and a switch 11b such as a field effect type transistor. These components are connected in series between the Vcc power supply (a constant direct current voltage) from the power supply circuit 22 and the ground potential. A gate signal is transmitted to the gate of the switch 11b from the control circuit 20 through the switching circuit 20. The high frequency low voltage signal of the square wave is outputted from the drain to the antenna electrode 4a through the connector 19a. The high frequency low voltage signal is determined in accordance with the gate signal subjected to PWM (Pulse Wide Modulation) control and outputted from the control circuit 20.

Figure 21A:
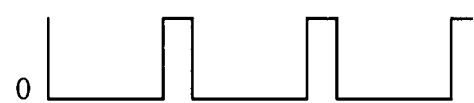
FIGS. 21A to 21D are timing charts illustrating a gate signal outputted from the control circuit, a high frequency low voltage signal at the time of the empty state and preset state on the seat; and a direct current output of an AC-DC converting circuit.
Figure 21B:

For example, the oscillating circuit 11A generates the high frequency low voltage signal that its frequency is about 120 KHz. It should be noted that the duty ratio (the ON duty) of the gate signal is set to about 10%, as shown in FIG. 21A. However, the duty ratio maybe changed into a suitable duty ratio by selecting a circuit constant, the frequency. The high frequency low voltage signal is outputted from the oscillating circuit 11A when the switch 1b is in the off state, and its duty ratio (the ON duty) becomes approximately 90%, as shown in FIG. 21B.

Also, in the interface circuit, the impedance converting circuit 23 is composed of an operational amplifier 23a having an amplification factor of 1. Therefore, the output side of the impedance converting circuit 23 is set to the low impedance, so that the current necessary for the CPU of the control circuit 20 to read can be taken out without any influence to the input side. The AC-DC converting circuit 24 is connected with the output of the impedance converting circuit 23. The AC-DC converting circuit 24 is composed of a smoothing circuit which is composed of a resistor 24a and a capacitor 24b. The output of the AC-DC converting circuit 24 is supplied to the control circuit 20 as the signal data, as in the first embodiment.

Next, the operation of this passenger detecting system in the second embodiment will be described with reference to FIGS. 14 and 20 and FIGS. 21A to 21D.

First, only the switch 18a of the switching circuit 18 is closed in response to the switching control signal from the control circuit 20, and the other switches 18b to 18f are opened. By this, the gate signal is transmitted to the switch 11b of the oscillating circuit 11A in the interface circuit Aa, as shown in FIG. 21A. Each time the gate signal becomes high, the switch 11b is turned on, so that the drain is set to the ground level is not outputted and the high frequency low voltage signal to the antenna electrode 4a. It should be noted that in this case, the electric charge which has accumulated in a capacitance component around the antenna electrode 4a is discharged through the switch 11b.

On the other hand, when the gate signal becomes low, the switch 11b is turned off. Therefore, a high frequency low voltage signal with the approximate square wave of 120 KHz and +5 V is outputted to the antenna electrode 4a through the connector 19a, as shown in FIG. 21B. As a result, a weak electric field is generated around the antenna electrode 4a. The current flow may be of different levels depending upon various factors such as whether or not a passenger is present in the seat, and whether the is an adult or a child. It should be noted that because a gate signal is not transmitted to the switches 11b of the oscillating circuits 11A in the interface circuit Ab to Af, the Vcc voltage is applied to the antenna electrode 4b to 4f.

For example, when no passenger is present in the seat, a low level current flows in accordance with a stray capacitance which exists around the antenna electrode 4a. In this case, the rising portion of the high frequency low voltage signal becomes rounded in accordance with a CR time constant of the stray capacitance and the resistor 11a of the oscillating circuit 11A, as shown in FIG. 21B.

Figure 21C:

On the other hand, when a passenger is present in the seat 1, the capacitance component is larger than the stray capacitance around the antenna electrode 4a when the seat is empty current flows. It should be noted that the capacitance component becomes larger hen the passenger is an adult than when the passenger is a child. Therefore, the level of the current which flows through the antenna electrode becomes high. In this case, the rising portion of the high frequency low voltage signal becomes like an exponential function. As a result, the rising portion is rather largely in accordance with the CR time constant of the resistor 11a and a large capacitance component which is larger than the stray capacitance, as shown in FIG. 21C. It should be 10 noted that the degree to which the rising portion becomes rounded is large for an adult passenger and small for a child passenger, because the capacitance component is different between an adult and a child.

In this way, the high frequency low voltage signal presents various patterns in accordance with the CR time constant. The signal from the antenna electrode is subjected to impedance conversion in the impedance converting circuit 23. That is, in the impedance converting circuit 23, the input side is set to a high impedance state and the output side is set to the low impedance state. The current necessary for the reading operation by the control circuit 20 can be provided suitably according to necessity. The output signal of the impedance converting circuit 23 is supplied to the AC-DC converting circuit 24. In this circuit 24, the alternating current line voltage is smoothed by the smoothing circuit 24, and is converted into a direct current, as shown in FIG. 21D.

Figure 21D:
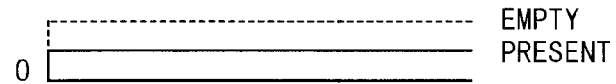

In FIG. 21D, the dotted line shows a direct current conversion level corresponding to when the passenger seat is empty and the solid line shows a direct current conversion level corresponding to when a passenger is present in the seat, respectively. There is a difference between the two levels such that it is possible to distinguish between them. It should be noted that if the resistor 11a is set to be constant in the above-mentioned CR time constant, this direct current conversion level depends on the capacitance component around the antenna electrode. For example, when the capacitance is large as is the case with an adult passenger, the direct current conversion level becomes low. On the other hand child, the direct current conversion level becomes high. When the passenger seat is empty this current detecting circuit as the signal data adult, and the variation becomes small when the passenger is a child. The direct current output from the current detecting circuit is transmitted as signal data tn by the control circuit 20, is subjected to the A/D conversion and is stored in the memory. Each time the switch 18a of the switching circuit 18 is switched to the switch 18b, the switch 18c, . . . , and the switch 18f, the data tn which relates to each antenna electrode 4b to 4f is outputted from the corresponding interface circuit and is transmitted one after another by the control circuit 20.

In the control circuit 20, like the above-described first embodiment, calculation processes are performed such as the calculation of the amount S of signal data tn, the normalizing process of the signal data on the basis of the largest signal data tnmax, the calculation of the amount ST of normalized data Tn, the calculation of the gravity of the normalization data, and the comparison between the various calculation results and the threshold and the determination result. That is, in the control circuit 20, the threshold values for determining whether or not a passenger is present in the seat, and for distinguishing between an adult passenger and a child passenger are previously stored in the memory (the memory means).

More specifically, the threshold value for determining whether or not a passenger is present in the seat is set as follows. That is, when a passenger is present in the seat, the difference is generated in the capacitance component around each of the antenna electrodes 4a to 4f because of the difference in the contact area for the antenna electrodes 4a to 4f. However, the capacitance component becomes fairly larger than in the stray capacitances which are present around the antenna electrodes 4a to 4f when the seat is empty. As a result, a significant difference is generated in the level of current which flows through the antenna electrodes 4a to 4f. Not only does the level of current flow increase compared to when the passenger seat is empty, but also the rising portion of the displaced current becomes rounded in the voltage waveform of the line voltage in relation to the difference of the CR time constant. The variation of the direct current level outputted from the AC-DC converting circuit 24 from the level when the seat is empty becomes large. Therefore, when a passenger is present in the seat, the direct current level becomes low, as shown by the solid line in FIG. 21D.

Figure 6:
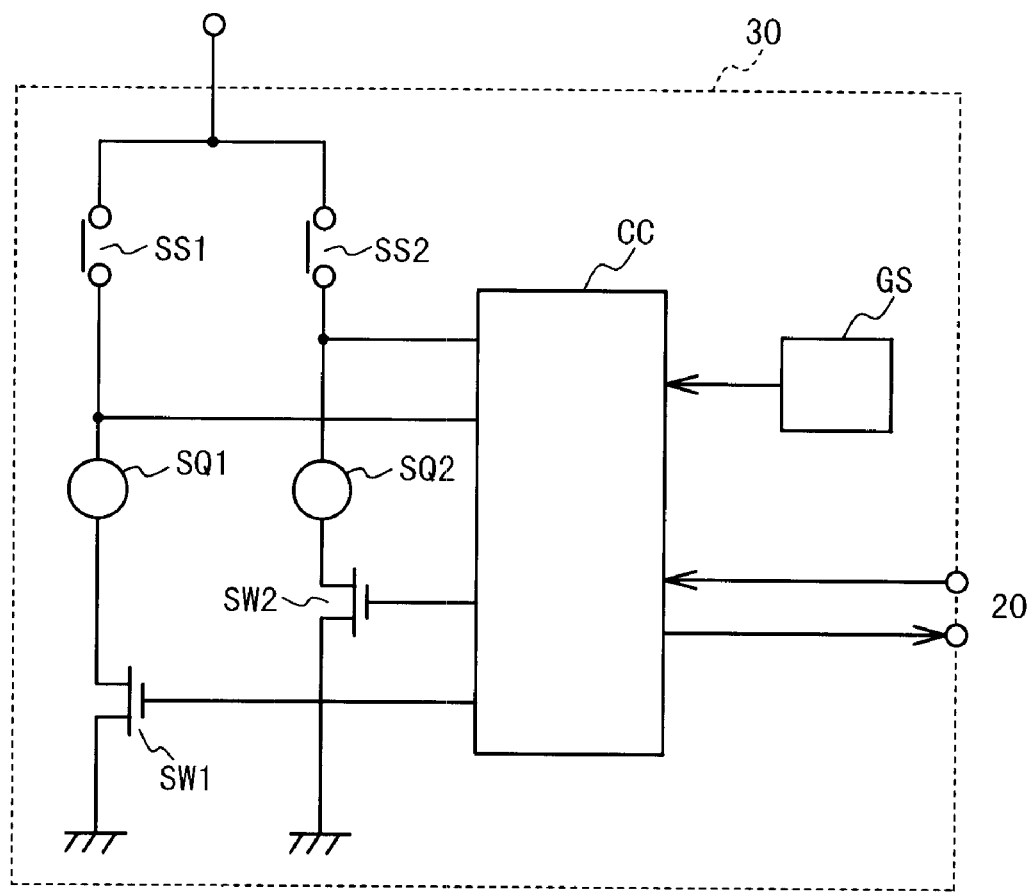
FIG. 6 is a circuit block diagram of an air bag control system of an air bag apparatus according to the first embodiment of the present invention.

However, the variation from the empty seat level shown by the dotted line in the same figure becomes large. For this reason, the level between the solid line corresponding to the amount S of the signal data tn and the dotted line is set as the threshold value THe for determining whether or not a passenger is present in the seat. It should be noted that a passenger is judged to be present in the seat when the amount S of the variations of the direct current output is larger than the threshold value THe, and it is judged that no passenger is present if the amount S is smaller than THe adult or a child passenger is present in the seat, a difference is generated in the capacitance component around the antenna electrode because of the difference of the contact area between each antenna electrode and the body portions of the passenger. As a result, the level of the current which flows through the antenna electrode is different. The current level becomes high when the passenger is an adult compared with when the passenger is a child. In addition, the rising portion of the voltage waveform of the line voltage obtained from the antenna electrode becomes dull in relation to the difference of CR time constants the seat is empty. This signal data tn is normalized in accordance with the maximum signal data tnmax of the signal data, and the summation ST of the normalized data is calculated. Therefore, an intermediate value between the summations ST for an adult passenger and for a child is set as the threshold value TH1 for distinguishing the size of the passenger. It should be noted that the passenger is judged to be an adult if the summation ST of the actual normalized data is larger than this threshold value TH1 and is judged to be a child if the summation is smaller than the threshold value level when the seat is empty and is higher than the threshold value TH1, the passenger in the seat is judged to be an adult. As a result, the air bag control system 30 shown in FIG. 6 is set to the air bag expansion allowed state in response to the expansion control signal from the control circuit 20.

On the other hand passenger in the seat is judged to be a child. As a result, the air bag control system 30 shown in FIG. 6 is set to the expansion inhibited state in response to the expansion control signal from the control circuit 20.

According to this embodiment, in addition to the attainment of the same effects as with the above-mentioned first embodiment, the following effects are achieved the weak electric field is selectively generated around the plurality of the antenna electrodes 4a to 4f. Also a determination of whether a passenger is present and whether a passenger is an adult or a child is performed through the calculating process the signal data relating to the weak electric field.

However, when a specific one of the antenna electrodes 4a to 4f is selected, the direct current voltage Vcc is given to all the antenna electrodes other than the selected antenna electrode. Therefore, the influence of foreign noise and the like can be removed, and the electric field generated in the neighborhood of the selected antenna electrode becomes stable. As a result, the electric current flowing in accordance with this is also stabilized. Therefore, the precision and reliability of the passenger detection determination in accordance with the signal data relating to the electric current can be improved. In particular, when the air bag control system 30 can be reliably set to either the expansion allowable state or the expansion inhibited state in accordance with the determination result. Thus, undesired expansion of the air bag can be prevented outputted from the oscillating circuit 11A. Therefore, the voltage waveform of the line voltage corresponding to the electric currents which flow to the antenna electrodes 4a to 4f is accepted and is converted into the direct current signal. The presence or absence of a passenger in the seat can be appropriately determined in accordance with the variation from the empty-seat level of this conversion data.

Also, the impedance converting circuit 23 is connected between the antenna electrodes 4a to 4f and the AC-DC converting circuit 24. Thus, the input side of the impedance converting circuit 23 is set to a high impedance state and the output side is set to a low impedance state. Therefore, when the direct current output of the AC-DC converting circuit 24 is inputted as signal data into by the control circuit 20, it does not have an influence on the high frequency low voltage signal to be supplied to the antenna electrodes 4a to 4f becomes possible.

Also, the capacitance component which is present around the antenna electrode is different depending upon whether a passenger in the seat is an adult or a child 11a connected with the antenna electrode. Therefore, the distinguishable signal data are obtained by the AC-DC converting circuit. Thus, the information regarding the passenger can be accurately determined in accordance with the signal data.

Moreover, the high frequency low voltage signal is outputted from the oscillating circuit 11A and is applied to the antenna electrodes 4a to 4f which are arranged in the seat. The switch lib is switched in response to the gate signal of the desired frequency, for example, 120 KHz, so that the voltage signal is obtained from the Vcc power supply of a single voltage generated from the power supply circuit 22. Compared with the oscillating circuit having a structure in which the direct current is converted into a high frequency alternating current signal and then waveform-shaped into a square wave, the circuit structures of the control unit and the oscillating circuit 11A can be simplified. Also, the cost of the system can be effectively reduced.

It should be noted that the present invention is not limited to only the above-described embodiments decreased. Also, it is possible to change the shape of the antenna electrodes into a rectangular band-shape or a loop-shape in other than the band-shape. Also, as long as the interface circuit can detect the signal data relating to the electric current which flows through the antenna electrode, the internal structure may have a different suitable structure other than the illustrated example.

In addition, the oscillating circuit may be formed to use a pulse signal which is outputted from the control circuit, in addition to the oscillating circuit making the high frequency low voltage of a sine wave or square wave. The output frequency may be set to a suitable frequency other than 120 KHz, and the voltage may be in a range of 5 to 12 V. Also, the amplitude control circuit can be omitted depending on the precision of the system power supply, the function which is expected of the system and so on. Moreover, the steps SC1 and SC2 can be omitted in the passenger distinguishing process passenger detecting system according to a preferred embodiment of the present invention will be described below. The principle of operation in the third embodiment is the same as in the first and second embodiments.

Figure 15A:
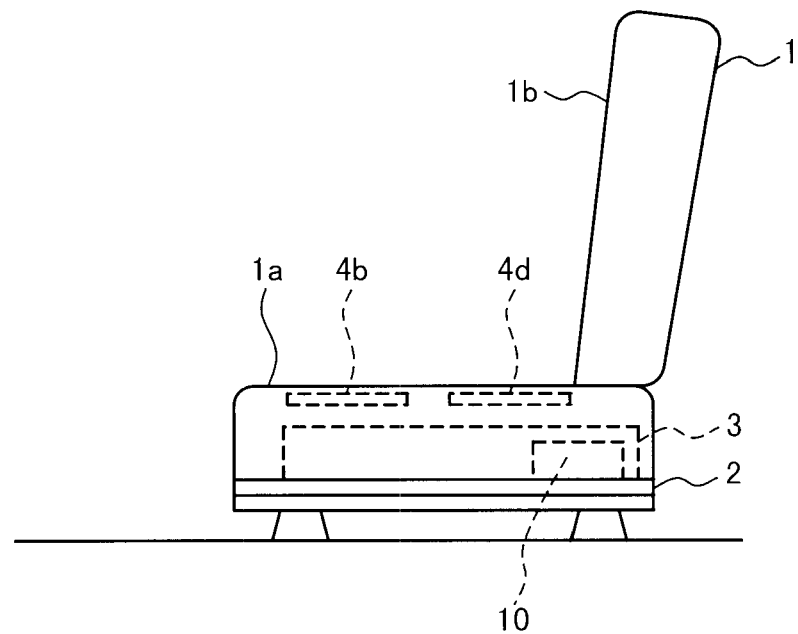
FIG. 15A is a side view of an antenna electrode section in a third embodiment of the present invention.
Figure 15B:
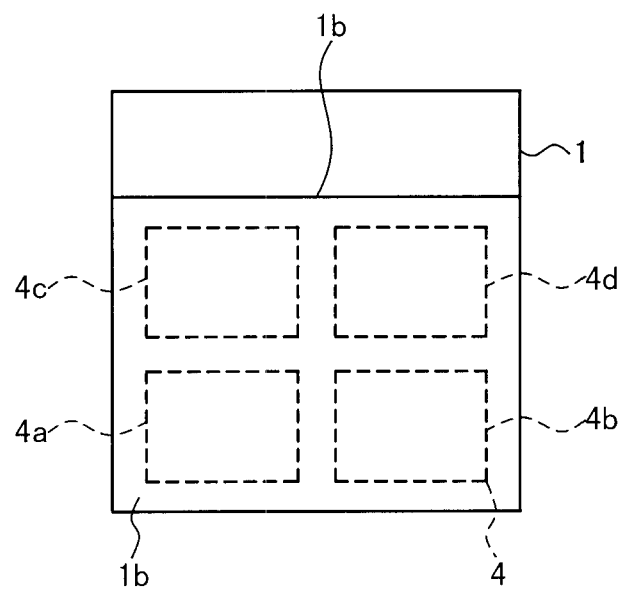
FIG. 15B is a plan view of an antenna electrode section in the third embodiment of the present invention.

FIGS. 15A and 15B shows a driver or passenger seat 1. Referring to FIGS. 15A and 15B, a seat 1 is composed of a seat section 1a and a back supporting section 1b. The seat section 1a is composed of a seat frame 3 which is fixed on a base 2 which is slidable forwards and backwards side of the seat frame, and an exterior material by which the cushion material is covered.

In the seat section 1a, an antenna electrode section 4 composed of a plurality of antenna electrodes 4a to 4d is arranged. The respective antenna electrodes 4a to 4d are formed to have substantially the same shape, e.g. a polygon shape, and are symmetrically arranged to be spaced from each other. However, the plurality of antenna electrodes may be arranged in both the seat section 1a and the back supporting section 1b. It should be noted that a control unit 10 to be described later is incorporated into the seat 1, and is arranged in the seat frame 3 or in the neighborhood of the seat frame 3, for example.

The antenna electrode section 4 includes a base member and the antenna electrodes 4a to 4d. The base member is-formed of an insulating member such as a non-woven cloth. The antenna electrode section 4 is arranged inside the exterior material of the seat section 1a. The antenna electrode section 4 is formed of a conductive cloth, for example. However, fibers which have a thread-shaped metal or conductor may be woven into the base member or the seat cloth surface of the seat section 1a, or a conductive paint may be coated onto the cloth surface. Also, lead lines composed of shielded wires are electrically connected with the desired portion of the antenna electrodes 4a to 4d, respectively. Moreover 115, a switching circuit 18, a current detecting circuit 15, a control circuit 20 and a power supply circuit 22. The oscillating circuit 11 outputs a high frequency low voltage signal of an alternating current sine wave by which weak electric fields are generated around the antenna electrodes 4a to 4d, respectively. The resistor 115 is connected with the oscillating circuit 11. The switching circuit 18 has a plurality of switches 18a to 18d 25 and is connected with the resistor 115 and the connectors 19a to 19d. The current detecting circuit 15 is connected with a node between the resistor 115 and the switching circuit 18. The current detecting circuit 15 is connected to any one of the antenna electrodes 4a to 4d through the switching circuit 18 and one of the connectors 19a to 19d when the appropriate switch is closed the alternating current line voltage relating to the current which flows through the antenna electrode 4a to 4d. The control circuit 20 contains a CPU, an analog-to-digital converting section, an external memory such as an EEPROM, an ROM and so on.

A connector 21 is connected with a battery power supply (not shown) which is arranged in the housing. The power supply circuit 20 is connected with the connector 21. These components are accommodated in the same housing and form a control unit 10, which is fixed so as not to be exposed on the passenger side in the seat frame 3 of the seat section 1a of the seat 1. An air bag control system-30 with the structure shown in FIG. 6 is connected with the control circuit 20 of the control unit 10. It should be noted that the selective switching of the switches 18a to 18d of the switching circuit 18 is performed in accordance with a signal from the control circuit 20.

In the above-mentioned control unit 10, the oscillating circuit 11 is composed of a quadrature oscillating circuit to output a high frequency low voltage signal having a sine wave form. It should be noted that suitable oscillating circuits such as a Wien bridge oscillating circuit can be used as the oscillating circuit, in addition to the quadrature oscillating circuit. In the output of the oscillating circuit 11, the frequency is about 120 KHz, and the voltage is 5 VP-P. However, it is possible to change these values as needed first and second 20 operational amplifiers 16a1 and 16a2, and first and second diodes 16b1 and 16b2 and resistors 16c1 to 16c3. The smoothing circuit 17 is composed of a resistor 17a and a capacitor 17b. It should be noted that the control circuit 20 is connected with the output side of the current detecting circuit 15.

Moreover, in the control unit 10, the power supply circuit 22 drops a voltage of 12 V from the battery power supply into 5 V to generate a single Vcc power supply. The power supply circuit 22 is composed of 3 terminal regulator generated by the power supply circuit 22 is supplied to the components which need the power supply, from among the components of the control unit 10. It should be noted that it is desirable to make the Vcc power supply unitary but it is possible to set it to different voltages.

Figure 16:
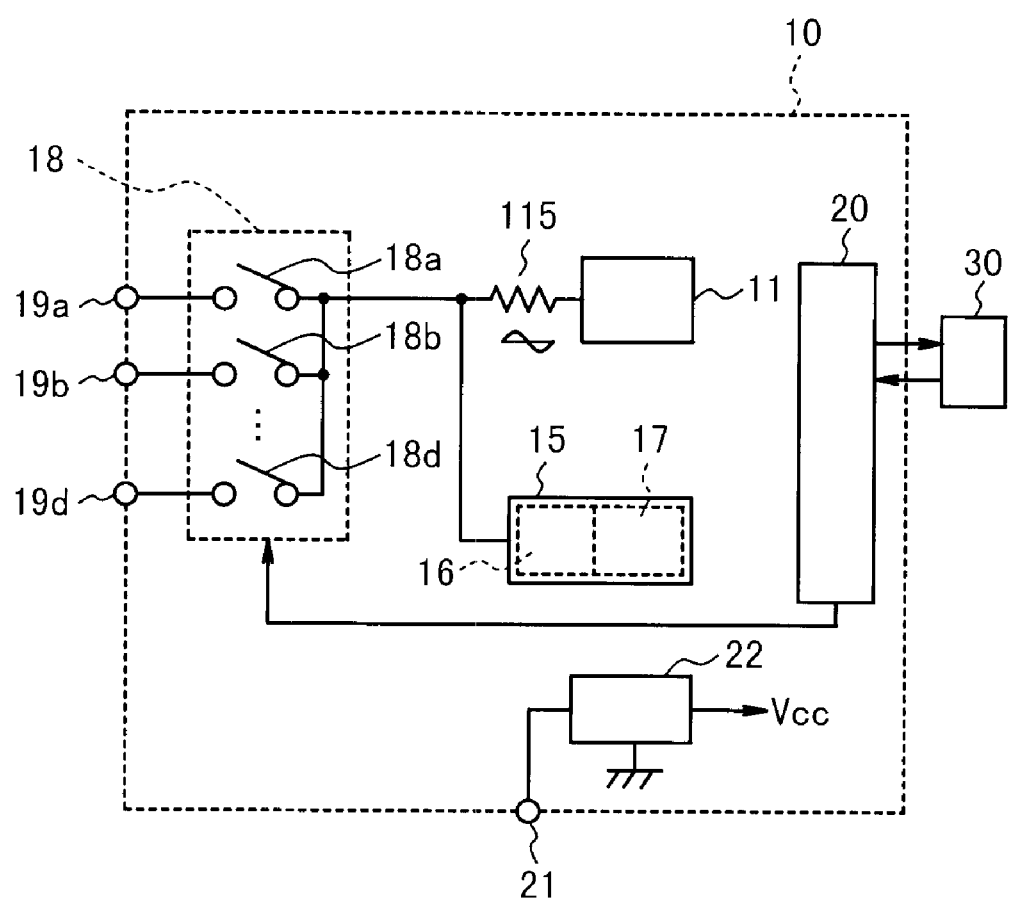
FIG. 16 is a block diagram illustrating the passenger detecting system according to the third embodiment of the present invention.
Figure 19A:
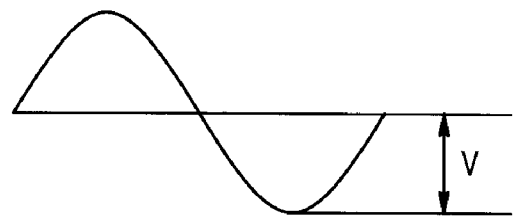
FIGS. 19A to 19C are waveform diagrams of a line voltage, the output voltage of a full wave rectifying circuit, and the output voltage of a smoothing circuit.

Next, the operation of the passenger detecting system with the above structure will be described with reference to FIGS. 17A and 17B and FIGS. 19A to 19C. When the oscillating circuit 11 in FIG. 16 first enters an oscillation state, the high frequency low voltage signal of the sine wave as shown in FIG. 19A is outputted from the oscillating circuit 11. The high frequency low voltage signal is supplied to the antenna electrodes 4a to 4d through the resistor 115, the switches 18a to 18d of the switching circuit 18, and the connectors 19a to 19d. As a result, a weak electric field is selectively generated around one of the antenna electrodes 4a to 4d. In this case, the switching circuit 18 controls the opening and closing operation in accordance with the switching control signal from the control circuit 20. First, only the switch 18a is closed, and next, only the switch 18b is closed.

First, only the switch 18a is closed, and next, only the switch 18b is closed. Hereinafter, only a specific switch is closed in order in the same way. At the same time, the switching control is performed in such a manner that the other switches are opened. Therefore, when the specific one of the switches 18a to 18d is closed, the high frequency low voltage signal is supplied to the specific one of the antenna electrodes 4a to 4d through the resistor 115, the specific one of the switches 18a to 18d and the specific one of the connectors 14a to 14d. As a result, a weak electric field is generated around the specific antenna electrode. The current flows with a level which varies in accordance with whether or not a passenger is present on the seat 1 and whether the passenger is an adult or a child.

When a passenger is present on the seat #1 around the specific antenna electrode when the passenger seat is empty. When a current with a high level flows, the voltage drop across the resistor 115 becomes large. Because an adult is larger than a child, which difference is registered in the capacitance component around the electrode current which flows through the antenna electrode becomes high and the voltage drop by the resistor 115 becomes large. Therefore, the line voltage of the transmission system of the oscillating circuit 11, the resistor 115, and the switching circuit 18 becomes as shown in FIG. 19A.

Because the capacitance component is different between an adult and a child in that the current which flows through the antenna electrode is different, the line voltage V is small when the passenger is an adult, and large when the passenger is a child. On the other hand, when nobody is present in the seat 1, a current with a low level flows in accordance with the stray capacitance around the specific antenna electrode. However, the voltage drop across the resistor 115 becomes very small and the line voltage V is set to a value which is near the output voltage from the oscillating circuit 11.

Figure 19B:
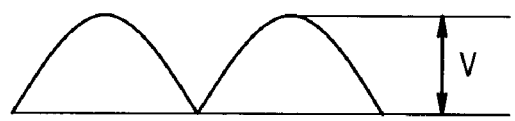
Figure 19C:
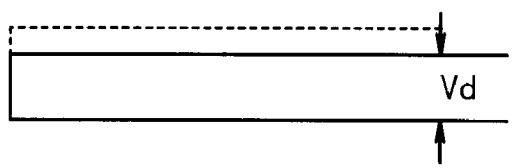

In this way, the alternating current line voltage of the output side of the resistor 115 is taken in by the current detecting circuit 15. The alternating current line voltage is first full-wave-rectified in the full wave rectifying circuit 16 as shown in FIG. 19B, and subsequently is converted into a direct current Vd by the smoothing circuit 17 as shown in FIG. 19C.

More particularly, when the voltage of the positive half cycle of the alternating current line voltage is supplied to the full wave rectifying circuit 16, the output side of the first operational amplifier 16a1 is negatively inverted and the second diode 16b2 is set to a cutoff state. As a result, the voltage of the positive half cycle which is applied to the second operational amplifier 16a2 through the resistor 16c2 is outputted to the output side of the second operational amplifier 16a2.

Next, when the voltage of the negative half cycle is inputted to the full wave rectifying circuit 16, the output side of the first operational amplifier 16a1 is inverted to the positive direction and the second diode 16b2 is set to the on state. As a result, the voltage which is inverted to the positive direction is outputted to the output side of the second operational amplifier 16a2. Therefore, the output voltage as shown in FIG. 19B is obtained as the output of full wave rectifying circuit 16.

In this way, the direct current output Vd of the current detecting circuit 15 differs in level in accordance with the output of the full wave rectifying circuit 16. In FIG. 19C, the dotted line indicates a direct current converting level when no passenger is present in the seat and the solid line indicates a direct current conversion level when a passenger is in the seat. There is a difference between the two levels to a degree such that it is possible to distinguish between the two around the antenna electrode, if the resistance value of the resistor 115 is set to a constant value. For example, it becomes small when the capacitance is large as is the case for an adult passenger. On the other hand empty A/D conversion and is stored in the memory.

Figure 17A:
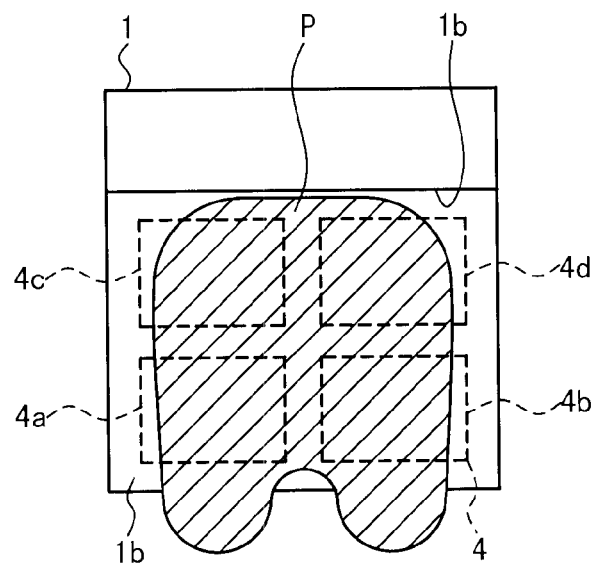
FIGS. 17A and 17B are diagrams illustrating the states of the passenger of an adult on the seat and of the passenger of a child.
Figure 17B:
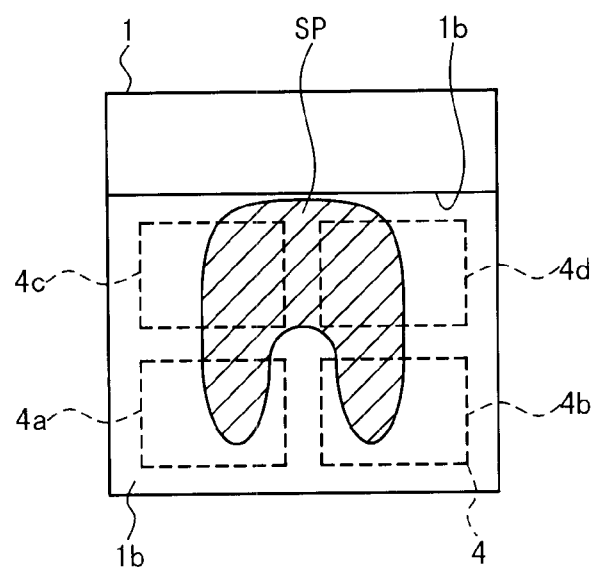
Figure 18:
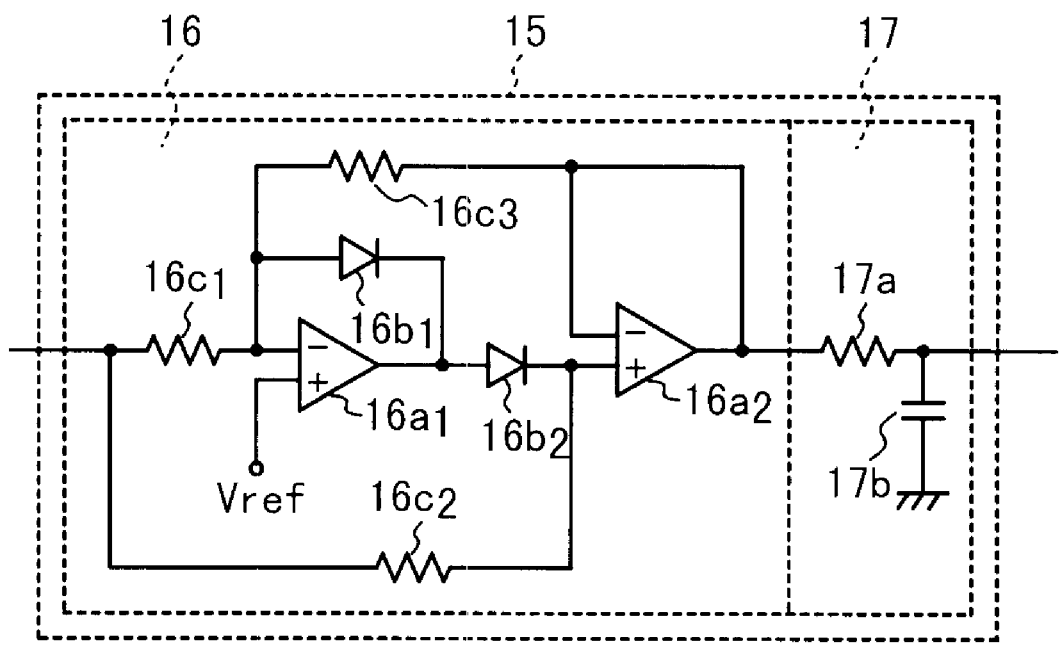
FIG. 18 is a circuit diagram illustrating a 20 current detecting section of the passenger detecting system according to the third embodiment of the present invention.

In the control circuit 20, threshold values are previously stored which are concerned with detecting the occupancy state of the seat 1, i.e., the presence or absence of a passenger, and distinguishing between an adult or a child passenger. More specifically, the threshold value relating to the presence or absence of a passenger is set as follows. That is, as shown in FIGS. 17A and 17B, when a passenger P is present in the seat 1, the capacitance component around each antenna electrode is different from each other depending upon the differences in contact areas between each antenna electrode and the body portions of the passenger. As a result, the current levels which flow through the antenna electrodes are different from each other.

When the passenger P is an adult, the current level becomes high, compared with when the passenger SP is a child. Therefore, the voltage drops across the resistor 115 are different from each other in level, and the direct current detecting circuit 15 are also different. Therefore, an intermediate level between the direct current output which relates to the current level for a child passenger SP and the direct current output when the seat is empty is set as the threshold value for the determination of the presence or absence of a passenger in the seat.

It should be noted that a passenger is determined to be present in the seat if the direct current output is smaller than the threshold value. Also, it is determined that no passenger is in the seat if the direct current output is larger than the threshold value. It is desirable to set the threshold value according to the summation of the direct current outputs from the current detecting circuit 15 relating to the current which flows through the respective antenna electrodes 4a to 4d. However, it is possible to set the threshold value based on every antenna electrode.

Also, the threshold value for distinguishing the size of a passenger is set as follows. That is, as shown in FIG. 17A, when an adult passenger P is present in the seat 1, the level of the current which flows through each antenna electrode becomes large and the line voltage of the transmission system becomes low because of the voltage drop across the resistor 115. The direct current level which is outputted from the current detecting circuit 15 is the level (Vd) indicated by the solid line in FIG. 19C.

On the other hand, as shown in FIG. 17B, when the passenger SP present on the seat 1 is a child, the current level which flows through each antenna electrode becomes small. Also the line voltage of the transmission system becomes small because of the voltage drop across the resistor 115. The direct current level which is outputted from the current detecting circuit 15 is between the level shown by the solid line and the dotted line in FIG. 19C. Therefore, the direct current output which relates to the intermediate current level between that for an adult passenger P and that of a child passenger SP is set as the threshold value for the distinguishing process. It should be noted that the passenger is determined to be an adult P if the direct current conversion data is smaller than the threshold value, and it is determined that the passenger is a child SP if the direct current conversion data is larger than the threshold value. In particular the threshold value to the summation of the direct current outputs representing the signal data from the current detecting circuit 15 relating to the current which flows through each antenna electrode. However; it is possible to set the threshold value for every antenna electrode.

Therefore, the signal data relating to the presence or absence of a passenger are taken in by the control circuit 20 and is compared with the threshold value relating to the presence or absence of a passenger which is previously stored in the control circuit 20. For example, as shown in FIG. 17A lower than the threshold value for distinguishing if a passenger is in the seat the seat 1 is determined to be an adult P. Upon such determination, in response to the expansion control signal from the control circuit 20.

On the other hand higher than the threshold value for distinguishing if a passenger is in the seat, the passenger in the seat 1 is determined to be a child SP. Upon such termination the latter determination described above, the system is set so that a gate signal is not supplied to the switching element SW2 on the passenger seat side when the automobile becomes involved in a collision seat side. Upon the former determination, the system is set so that a gate signal to be supplied to the switching elements SW1 and SW2.

In this manner the third embodiment, the current determined in accordance with the capacitance component around the antenna electrode flows through the antenna electrodes 4a to 4d in accordance with the high frequency low voltage signal from the oscillating circuit 11. In this case, the voltage drop associated with the current is caused by the resistor 115 which is connected with the transmission system. The line voltage of the transmission system becomes the voltage which is associated with the current which flows through the antenna electrode. The current which flows through the antenna electrode is changed depending upon whether or not a passenger is present in the seat 1 and, when a passenger is present, whether or not the passenger is an adult. Therefore, by converting the line voltage from an alternating current into a direct current in the current detecting circuit 15, a direct current signal data is obtained to enable the passenger detection determination the signal data and can appropriately determine the presence or absence of a passenger in the seat 1 in accordance with the signal data relating to the direct current signal data.

In addition, the presence or absence of a passenger in the seat 1 is determined in accordance with the signal data relating to the direct current output from the current detecting circuit 15 by the control circuit 20. Also, the determination result is transmitted to the air bag control system 30 through the communication section. Therefore, the air bag apparatus can be appropriately controlled in accordance with the presence or absence of a passenger in the seat 1.

Next, a passenger detecting system according to a fourth preferred embodiment of the present invention will be described below.

In the above-described third embodiment, the full wave rectifying circuit 16 of the current detecting circuit 15 is composed of first and second operational amplifiers 16a1 and 16a2, first and second diodes 16b1 and 16b2, and resistors 16c1 and 16c3. However, because the forward voltage of each of the first and second diodes 16c1 and 16b2 has a negative temperature coefficient, the forward voltage changes depending upon the ambient temperature. For this reason, the output voltage of the full wave rectifying circuit 16 changes in accordance with the cycle which is inverted by the first operational amplifier 16a1 so that the level of the direct current output from the smoothing circuit 17 changes, too.

In the passenger detecting system in the fourth embodiment, the current detecting circuit 15 is simplified and the manufacturing cost is reduced.

Figure 22:
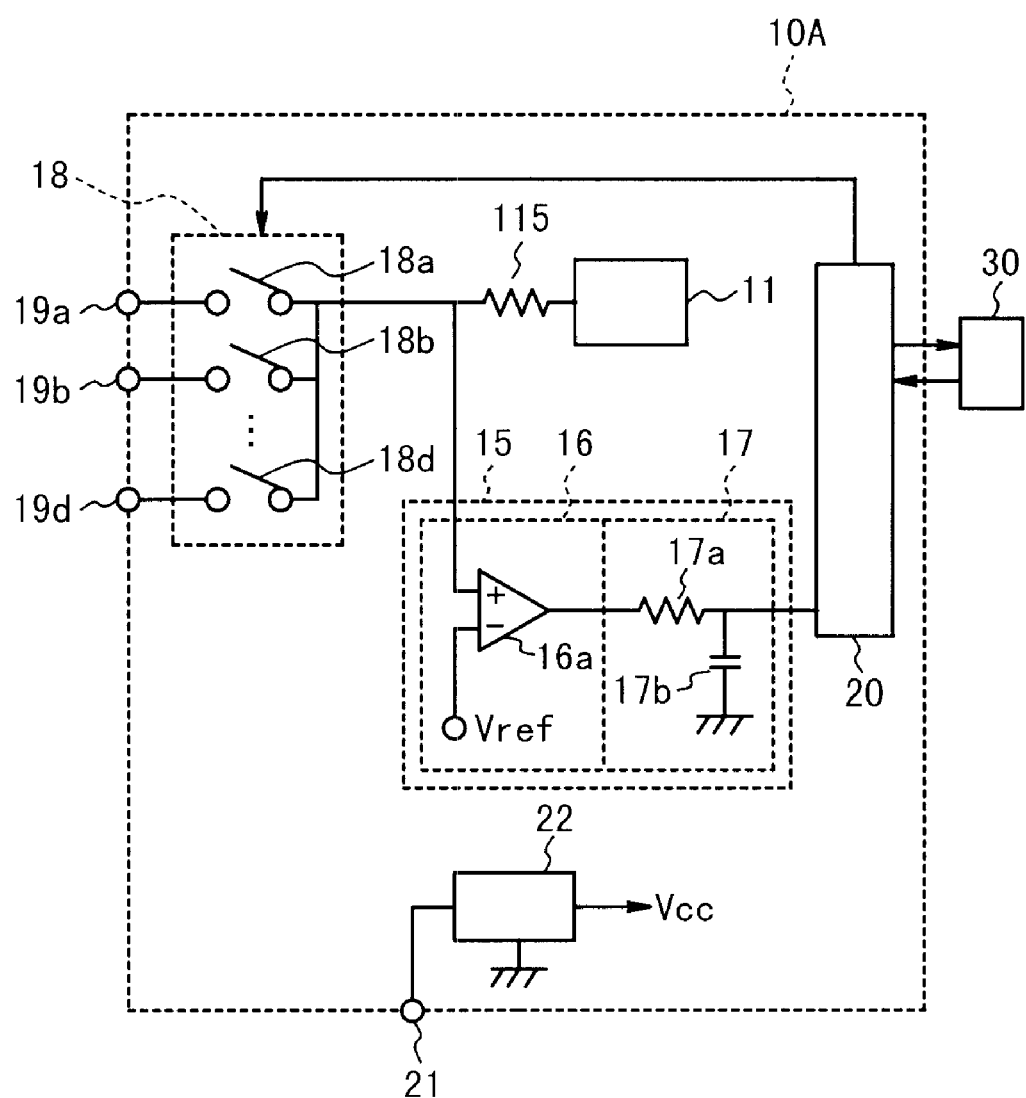
FIG. 22 is a circuit diagram showing the passenger detecting system according to the fourth embodiment of the present invention.

In FIG. 22, reference numeral indicates a control unit which is incorporated into the seat 1 shown in FIG. 15A. As shown in FIG. 22, the control unit 10A is composed of an oscillating circuit 11, a resistor 115, a switching circuit 18 having a plurality of switches 18a to 18d, an current detecting circuit 15, connectors 19a to 19d, a control circuit 20 and a power supply circuit 20. The oscillating circuit 11 outputs a high frequency low voltage signal of an alternating current sine wave to be supplied to the antenna electrodes 4a to 4d such that a weak electric field is generated around the antenna electrodes 4a to 4d. The resistor 115 is connected with transmission system from the oscillating circuit 11 to the antenna electrode section 4. The switching circuit 18 for the antenna electrode section 4a to 4d is connected with the output side of the resistor 115. The connectors 19a to 19d are arranged in the housing of the control unit 10A and connected to the switches 18a to 18d of the switching circuit 18. The current detecting circuit 15 is connected to a node between the output side of the resistor 115 and the switching circuit 18 and converts an alternating current line voltage into a direct current on the transmission system line. The line voltage relates to the current which flows through the antenna electrodes 4a to 4d on the output side of the resistor 115. The control circuit 20 contains a CPU, an analog-to-digital converting section, and an external memory such as an EEPROM, a ROM and so on. The connector 21 is connected with a battery power supply (not shown) which is arranged in the housing. The power supply circuit 20 is connected with the connector 21.

These components are accommodated in the same housing and form the control unit 10A, which is arranged so as not to be exposed on the passenger side in the seat frame 3 of the seat section 1a of the seat 1. An air bag control system 30 with the structure shown in FIG. 6 is connected with the control circuit of the control unit 10A. It should be noted that the selective switching of the switches 18a to 18d of the switching circuit 18 is performed in accordance with a switching control signal from the control circuit 20.

Figure 23A:
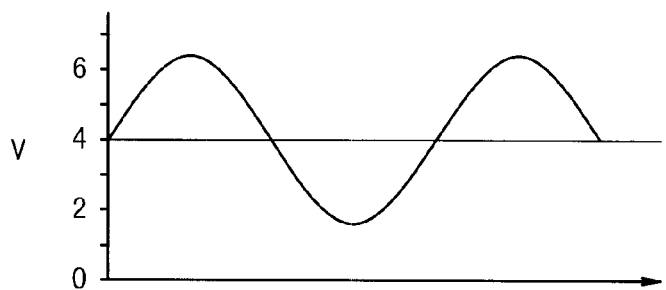
FIGS. 23A to 23C are waveform diagrams of line voltage, the output voltage of a half wave rectifying circuit, and the output voltage of smoothing circuit.

In the above-mentioned control unit 10A, the oscillating circuit 11 is composed of a quadrature oscillating circuit to output a sine wave alternating current signal such as a high frequency low voltage signal. As shown in FIG. 23A, only the sine wave component on the positive side (for example, 5 Vp-p with a center at 4 V) is used. It should be noted that suitable oscillating circuits such as a Wien bridge oscillating circuit can be used as the oscillating circuit in place of the quadrature oscillating circuit.

Also, the current detecting circuit 15 is composed of a half wave rectifying circuit 16 and a smoothing circuit 17. The half wave rectifying circuit 16 is composed of a single operational amplifier 16a. The line voltage in the transmission system is applied to a non-inversion input terminal (+), and a suitable reference voltage Vref such as a voltage of 4 V is applied to an inversion input terminal (−).

When the oscillating circuit 11 is composed of the quadrature oscillating circuit and first enters an oscillation state, a sine wave high frequency low voltage signal is outputted from the oscillating circuit 11. It should be noted that the output voltage of the oscillating circuit 11 is set to be the voltage of 5 Vp-p with a center at 4 V. The output voltage is supplied to the antenna electrodes 4a to 4d through the resistor 115, i.e., a transmission system, and the alternating current line voltage appears on the output side of the resistor 115 as shown in FIG. 23A.

The high frequency low voltage signal is supplied to the antenna electrodes 4a to 4d through the transmission system, the switching circuit 18, and the connectors 19a to 19d. As a result, a weak electric field is generated around the antenna electrodes 4a to 4d. In this case, the switching circuit 18 controls the opening and closing operation in accordance with the switching control signal from the control circuit 20. First, only the switch 18a is closed, and next, only the switch 18a is closed, and next, only the switch 18b is closed. Hereinafter, only a specific switch is closed in order in the same way. At the same time, the switching control is performed in such a manner that the other switches are opened.

When the specific one of the switches 18a to 18d is closed, the high frequency low voltage signal is supplied to the specific one of the antenna electrodes 4a to 4d. As a result, a weak electric field is generated around the specific one of the antenna electrodes 4a to 4d. The current flows at a level which is differs according to whether or not a passenger is present in the seat 1 and to a determination of whether a passenger is an adult or a child in the seat 1, a lower current flows in accordance with a stray capacitance around the specific antenna electrode. Because the voltage drop across the resistor 115 becomes small, the line voltage on the output side of the resistor 115 is approximate to the output voltage of the oscillating circuit 11. On the other hand, when a passenger is present in the seat 1, a higher current flows because a large capacitance component is present around the specific antenna electrode compared with the stray capacitance present when the seat is empty.

It should be noted that the capacitance component is larger when an adult is in the seat than when a child is in the seat, and the level of the current which flows through the antenna electrode becomes high. For this reason, the voltage drop across the resistor 115 becomes large. The line voltage of the output side of the resistor 115 is fairly lower than the output voltage of the oscillating circuit 11 when an adult is in the seat, and is higher than the level for the adult when a child is in the seat but is lower than the output voltage of the oscillating circuit 11.

Figure 23B:
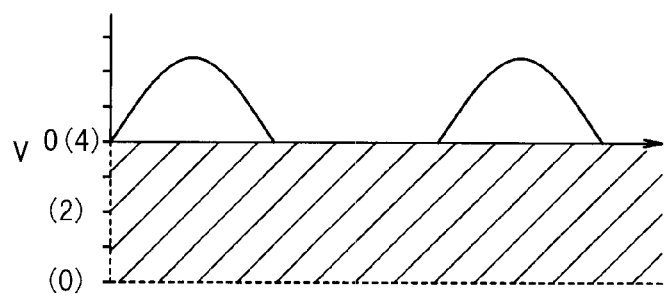

The line voltage of the transmission system which corresponds to the presence or absence of a passenger in the seat 1 is supplied to the current detecting circuit 15A. That is, the line voltage is supplied to the non-inversion input terminal (+) of the operational amplifier 16a of the half wave rectifying circuit 16. A reference voltage Vref of +4 (V(DC) is applied to the inversion input terminal (−) of the operational amplifier 16a. Therefore, a half wave rectified voltage having a center voltage of 4 V is outputted on the output side as shown in FIG. 23B. The half wave rectified voltage is smoothed by the smoothing circuit 17 which is composed of a resistor 17a and a capacitor 17b. Thus, the direct current output is obtained as shown in Fib. 23C.

Figure 23C:
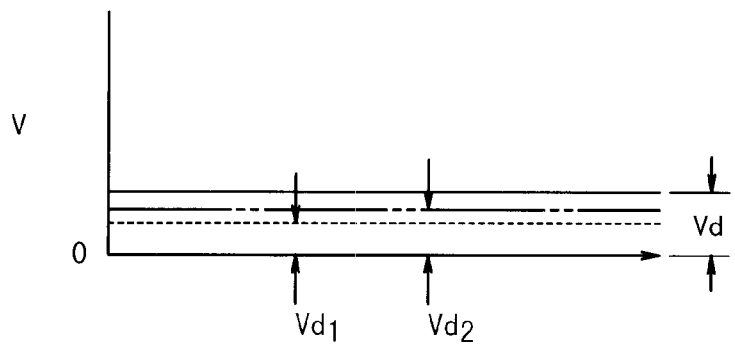

It should be noted that in FIGS. 23A to 23C, the direct current output Vd shown by the solid line shows a direct current conversion level at the time the seat is empty when an adult passenger P is in the seat. The direct current output Vd2 shown by the two-chain lineshows a direct current conversion level when a child passenger SP is in the seat. There are distinguishable differences in level among the three cases. The direct current outputs from the current detecting circuit 15 are taken in one after another by the control circuit 20, is A/D converted and then is stored in a memory.

In the control circuit 20, threshold values are previously stored which are concerned with the detection of a passenger on the seat 1 (the distinguishing between an adult or a child). More specifically, the threshold value relating to the presence or absence of a passenger is set as follows.

As shown by FIGS. 17A and 17B, when an adult passenger P or a child passenger SP is present in the seat 1, a difference is generated in the capacitance component around each antenna electrode depending upon the difference in the contact area between each antenna electrode and the body of the passenger. As a result, the current level which flows through the antenna electrode is different, and the voltage drop across the resistor 115 is also different. Therefore, the line voltage takes on different values. Also, the direct current level which is outputted from the current detecting circuit 15 takes different levels, too, as shown in FIG. 23C. Therefore, the threshold value relating to the presence or absence of the passenger is set to a value between the solid line and the two-chain line in FIG. 23C.

Also, the threshold value for distinguishing whether or not a passenger is an adult is set to a value between the dotted line and two-chain line in FIG. 23C. It is desirable to set these threshold values to the summation of the direct current outputs from the current detecting circuit 15 which relates to the current which flows through each antenna electrode. However, it is possible to set threshold values for every antenna electrode.

Therefore, the signal data relating to the presence or absence or a passenger are received by the control circuit 20 and are compared with the threshold value relating to the presence or absence of a passenger which has been previously stored in the control circuit 20. For example, as shown in FIG. 17A, when the direct current outputs from the current detecting circuit 15 is lower than the threshold value in the seat 1 is determined to be an adult P. Upon such determination, the air bag of the air bag control system 30 shown in FIG. 6 is set to the expansion allowed state in response to the expansion control signal from the control circuit 20.

On the other hand, as shown in FIG. 17B, the direct current outputs from the current detecting circuit 15 are higher than the threshold value for detecting the presence of a passenger, a passenger in the seat 1 if determined to be a child SP. Upon such determination, the air bag of the air bag control system 30 shown in Fib. 6 is set to the expansion inhibited state in response to the expansion control signal from the control circuit 20.

That is, the expansion control signal from the control circuit 20 is supplied to the control circuit CC of the air bag control system 30. Upon the latter determination, the system is set so to not supply the switching element SW2 on the passenger seat side with the gate signal when the automobile is involved in a collision. It should be noted that the gate signal is supplied to the switching element SW1 on the driver's seat side. Upon the former determination, the system is set for the gate signal to be supplied to the switching elements SW1 and SW1.

According to this embodiment, because the half wave rectifying circuit 16 of the current detecting circuit 15 is composed of the single operational amplifier 16a, the circuit structure can be simplified remarkably compared with the full wave rectifying circuit 16 in the previous embodiment and can reduce the manufacturing costs to 30 to 50% of the previous embodiment.

Also, the half wave rectifying circuit 16 does not require the use of a diode, unlike the full wave rectifying circuit 16 in the third embodiment. A change in the ambient temperature never changes the direct current output of the current detecting circuit 15. Therefore, not only the precision of the determination of the presence or absence of a passenger in the seat in the control circuit 20 in accordance with the direct current output, but also the reliability thereof can be imposed.

In particular, the presence or absence of a passenger in the seat is determined in accordance with the signal data outputted from the current detecting circuit 15 and received by the control circuit 20. The plurality of antenna electrodes 4a to 4d are arranged in the seat 1. Each of these antenna electrodes is selected in turn by the switching circuit 18. Also, a lot of signal data are received by the control circuit 20. Therefore, because a determination in the control circuit 20 is performed in accordance with all of the signal data, it becomes possible to perform the passenger detection process with higher reliability 10A accommodates circuit elements such as the oscillating circuit 11, the switching circuit 18, the current detecting circuit 15, the control circuit 20, and the power supply circuit 20 in the same housing. Therefore, the control unit 10A can be incorporated in the seat 1. Because it is relatively easy to secure such an arrangement on the seat frame 3 of the seat section 1a or in the neighborhood thereof, it is possible to incorporate the control unit in the seat simply and easily, even if the control unit 10A becomes large.

Also, because the control unit 10A is incorporated into the seat 1 where the plurality of antenna electrodes 4a to 4d are arranged, when the antenna electrode section 4 and the control unit 10A are connected electrically by lead lines 6a to 5d, the wiring length can be made quite short, compared with a case in which the control unit 10A is in a dashboard, an engine room, and so on. Therefore, in addition to cost reduction, the influence of external noise can be reduced by the shortening of the wiring length. As a result, the reliability of the passenger detection function of the system can be improved.

Moreover, the air bag of the air bag control system 30 is set to either the expansion allowed state or the expansion inhibited state in accordance with the determination of a whether a passenger is an adult or a child. When the passenger is determined to be a child SP in accordance with the level of the direct current outputs of the current detecting circuit 15, the air bag of the air bag control system 20 is set to the expansion inhibited state. Therefore, even if the automobile is involved in a collision, the air bag is not expanded and the appropriate control of the air bag control system 30 becomes possible.

Next, a passenger detecting system accordance to a fifth preferred embodiment of the present invention will be described below.

Figure 24:
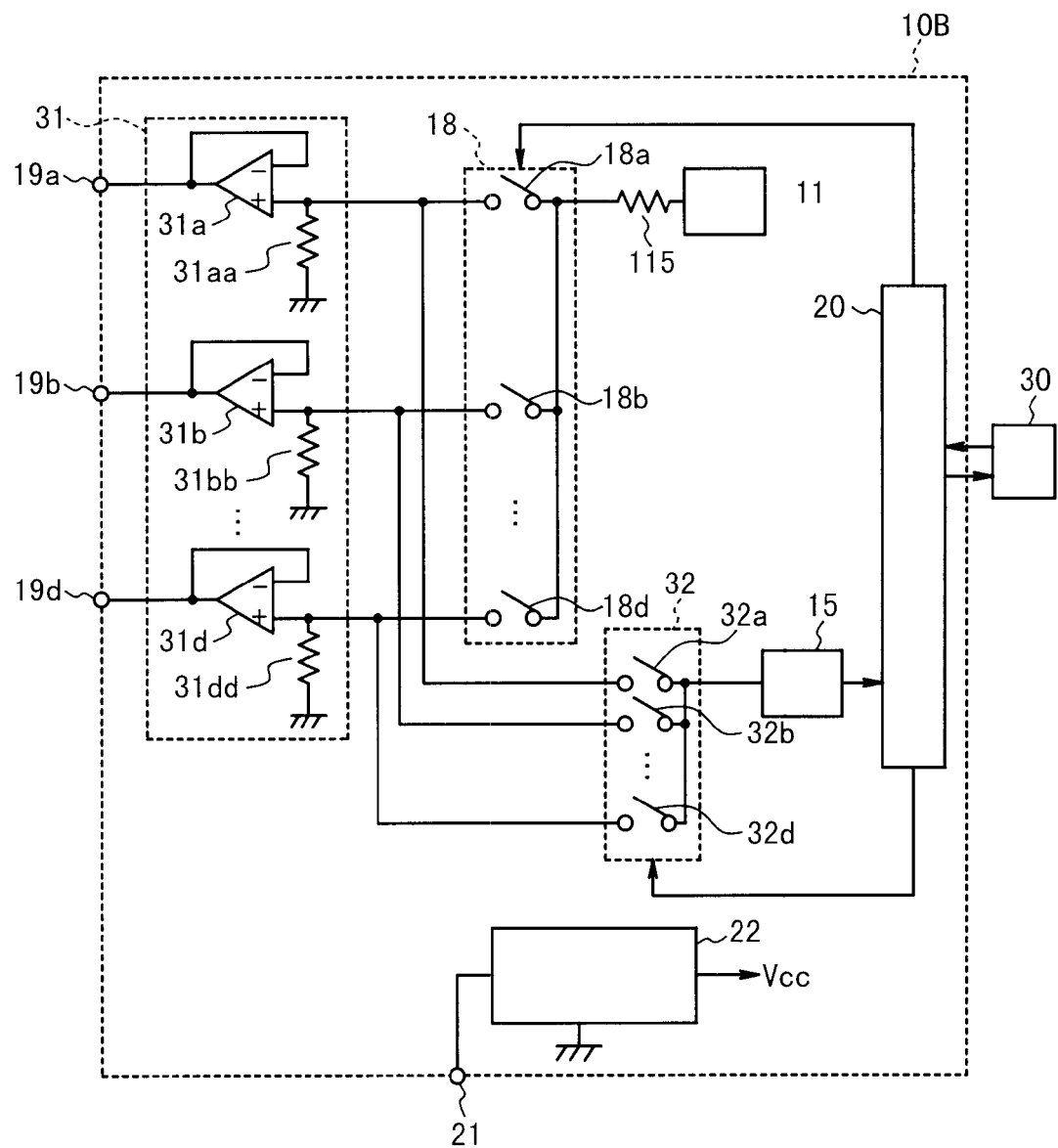
FIG. 24 is a circuit block diagram illustrating the passenger detecting system according to a fifth embodiment of the present inventions and FIG. 25 is a circuit diagram showing the passenger detecting system according to sixth embodiment of the present invention.

FIG. 24 is a diagram showing the fifth embodiment of the passenger detecting system accordance to the present invention. Of its components, a control unit 10B is basically the same as the embodiment which is shown in FIG. 22. A point of difference is that that a buffer circuit 31 is connected between a first switching circuit 18 and the connectors 19a to 19d. Also, a second switching circuit 32 is provided to select a suitable one of the antenna electrodes 4a to 4d on the output side of the first switching circuit 18. Moreover, the current detecting circuit 15 is connected with the output side of the second switching circuit 32.

The buffer circuit section 31 is composed of a plurality of buffer circuits which correspond to the antenna electrodes 4a to 4d. The respective buffer circuits are compared of operational amplifiers 31a to 31d and resistors 31aa to 31dd. These operational amplifiers are set to have an amplification factor of approximately 1. The alternating current line voltage is applied to the non-inversion input terminal (+) which is grounded through the resistors 21aa to 21dd. Therefore, the side of the first switching circuit of the buffer circuit is set to high impedance and the side of the antenna electrode is set low impedance. Thus, current can be applied to the antenna electrode without any an influence on the input side.

The passenger detecting system operates as follows. First, only the switch 18a of the first switching circuit 18 is closed, and the other switch 18b to 18d are set to an open state. In this case, the output of the sine wave alternating current voltage of the oscillating circuit 11 is applied to the antenna electrode 4a through the resistor 115, the switch 18a, the operations amplifier 31a of the buffer circuit, and the connectors 19a. By this, a weak electric field is generated around the antenna electrode 4a and the current flows in accordance with the presence or absence of a passenger in the seat.

The line voltage corresponding to the voltage drop in the resistor 115 appears in accordance with the current in the transmission system. When only the switch 22a of the second switching circuit 32 is closed, the line voltage relating to the current which flows through the antenna electrode 4a is inputted to the current detecting circuit 15A. The line voltage is subjected to half wave rectification and smoothing, so that a voltage which corresponds to the input is outputted and then is received in by the control circuit 20.

Next, the first switching circuit 18 and the second switching circuit 32 are switched such that only the switch 18b and 32b are closed. In this case, the sine wave alternating current signal of the oscillating circuit 11 is applied to the antenna electrode 4b through the resistor 115, the switch 18b, the operational amplifier 31b of the buffer circuit, and the connectors 19b. By this, a weak electric field is generated around the antenna electrode 4b, and a current flows in accordance with the presence or absence of a passenger on the seat. The line voltage corresponding to a voltage drop in the resistor 115 appears in accordance with the current in the transmission system.

The line voltage is supplied to the current detecting circuit 15, and is subjected to half wave rectification and smoothing such that a direct current voltage which corresponds to the input is outputted, and then is received by the control circuit 20.

Hereinafter, like the above described operations, a suitable antenna electrode is selected through the switching operation of the first and second switching circuits 18 and 32 and the direct current output which corresponds to the presence or absence of a passenger in the sent is received by the control circuit 20.

According to the fifth embodiment, as in the fourth embodiment, the line voltage of the transmission system is subjected to half wave rectification and smoothing in the current detecting circuit 15 which does not use a diode. Therefore, a change in the direct current conversion level due to a change in the ambient temperature can be restrained, and it is possible to improve the passenger detection precision and reliability.

Further, because the buffer circuit 31 is inserted in the transmission system, the current which corresponds to the presence or absence of a passenger in the seat can be applied to the antenna electrode without any influence on the input side. Therefore, as mentioned above, it is possible to improve the passenger detection precision and reliability.

Figure 25:
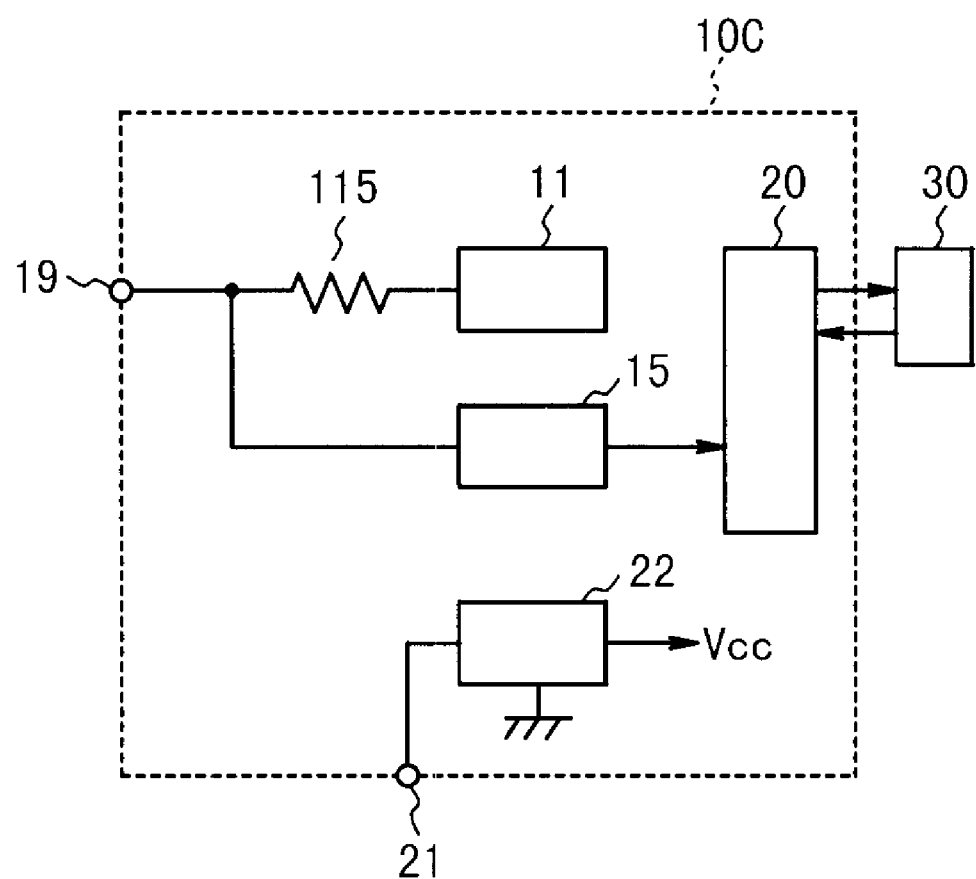

FIG. 25 shows a passenger detecting system according to a sixth preferred embodiment of the present invention. Of its components, the control unit 10C is basically the same as that in the third embodiment shown in FIG. 22. A point of difference is that a single antenna electrode 4 is arranged in the seat section 1a or the back supporting section 1b of the seat 1, or around it (e.g., a dashboard or a door). Also, the switching circuit 18 for selective switching and connection with the oscillating circuit 11 and the antenna electrode 4 is omitted in conjunction with the antenna electrode 4.

According to the sixth embodiment, because there is only one antenna electrode 4 is reduced and the passenger detection precision declines. However, the circuit structure can be simplified and thereby reduce the cost of the system.

If the antenna electrode 4 is arranged in a dashboard or a side port section of a door or seat, it can be detected if a passenger is asleep in the seat passenger such that an interval between the passenger and the antenna electrode 4 is however than a predetermined amount. Thus, it is possible to prevent the air bag apparatus or the side air bag apparatus from expanding. If this structure is applied to the embodiment illustrated in FIG. 22 or FIG. 24 in which a plurality of antenna electrodes are arranged in the seat 1, detection becomes possible in relation to the position of the passenger, in addition to detecting the of a passenger and the determination of whether the passenger is an adult or a child.

It should be noted that the present invention is not limited to the above described embodiments. For example, the antenna electrodes may be arranged at the back supporting section of the seat, and the number of antenna electrodes in the seat may be suitably increased or decreased. The antenna electrodes may have a rectangular, band, ring or spiral shape an insulating cover member.

Also, the oscillating circuit is not limited to a quadrature oscillating circuit or a Wien bridge oscillating circuit, and may be a circuit for generating a sine wave alternating current signal such as the high frequency low voltage signal. Also, the output frequency may be set to a value other than 120 KHz and it may be possible to set the voltage to a voltage other than 5 Vp-p, e.g., 3 to 20 V.

Also, the attachment state, a warning light of the seat belt and so on may be controlled in accordance with the determination result of the control circuit in place of the air bag apparatus. Moreover, as to a passenger determination, in accordance to comparing threshold values previously stored in the control circuit with signal data relating to the currents flowing through the actual antenna electrodes, the determination of whether a passenger is in the seat and whether the passenger is an adult may be performed by previously storing data relating to different detection patterns, passenger attributes in the seat and so on, and by comparing the stored data and the signal data.

It should be noted that the above-described embodiments may be applied together, as long as a discrepancy in the combined elements does not occurcontacts the body portions of the passenger such as the head, the neck, the shoulder, the back of the passenger which is present in the seat, depending on the difference of the contact area (the opposing area) of the body portion of the passenger and the seat. Therefore, each signal data is normalized in accordance with the maximum current. The summation of these normalized data is compared with the threshold value, so that it is possible to accurately determine whether the passenger is an adult or a child.

Also, each signal data which is received by the control circuit is normalized in accordance with the maximum signal data of the signal data, and the gravity of the data is calculated by use of these normalized data. The gravity is compared with the other threshold value, so that it is possible to accurately determine whether the passenger is an adult or a child.

If whether the passenger is an adult or a child is determined in accordance with whether or not the summation ST of the normalized data and the gravity P of the data respectively satisfy the relationships ST>TH1 and P<TH2, the determination precision can be improved.

Moreover, the signal data are received by the control circuit from the interface circuit and are normalized in accordance with the maximum signal data of the signal data. Therefore, the determination precision is not influenced by a change in the absolute value of the output signal due to the wear coating, the position of the passenger and so on, so that the reliability of the determination can be improved. Therefore, it is possible to reliably set the air bag of the air bag apparatus to either the expansion allowable state or the expansion inhibited state in accordance with an accurate passenger determination, and undesired expansion of the air bag can be prevented.

As above mentioned, according to the present invention, because the half wave rectifying circuit of the current detecting circuit is composed of one operational amplifier, the circuit structure can be simplified more significantly than with the full wave rectifying circuit, so that manufacturing the costs can be reduced by a large amount.

Also, because the half wave rectifying circuit does not require the use of a diode, unlike the full wave rectifying circuit, a change in the ambient temperature never changes the direct current output of the current detecting circuit. Therefore, it is possible to improve the precision of the detection of a passenger in the control circuit In particular, because the detection of a passenger is determined in accordance with signal data from the current detecting circuit which are received by the control circuit, a lot of signal data can be received in the control circuit, if a plurality of antenna electrodes are arranged in the seat. It is therefore possible to improve the determination precision in the control circuit and to perform the passenger detection with higher reliability.

Moreover, because the presence or absence of a passenger in the seat and so on are determined in accordance with the signal data relating to the direct current output from the AC-DC converting circuit in the control circuit, and the determination result is transmitted to the air bag apparatus through the communication means, the air bag apparatus can be appropriately controlled according to the presence or absence of a passenger in the passenger seat.

What is claimed is:

1. A passenger detecting system comprising:
   an antenna electrode provided in a seat to be occupied by a passenger;
   a signal generating circuit for generating and supplying a supply signal to said antenna electrode through a resistor such that an electric field is generated around said antenna electrode;
   a detecting circuit including said resistor, for detecting a direct current data signal from a line voltage associated with a voltage drop across said resistor, wherein said line voltage changes depending upon an object on said seat; and
   a control circuit for determining from said detected direct current data signal, whether or not a passenger is present in said seat and, if a passenger is present, whether said passenger is an adult or a child.

2. A passenger detecting system according to claim 1, further comprising an amplitude control circuit for detecting an amplitude of said supply signal and adjusting the amplitude thereof to a predetermined value based on the detected amplitude.

3. A passenger detecting system according to claim 1, wherein said supply signal is an alternating current signal having a frequency of about 120 KHz and a voltage in a range of 5 to 12 V.

4. A passenger detecting system according to claim 1, wherein said detecting circuit includes a converter for converting said line voltage of alternating current into a direct current signal.

5. A passenger detecting system according to claim 4, wherein said detecting circuit further includes an impedance converting circuit provided between said resistor and said converter and having a high impedance on an input side and a low impedance on an output side.

6. A passenger detecting system according to claim 1, wherein said detecting circuit includes:
   a rectifier for full wave rectifying said line voltage of alternating current into a direct current signal; and
   a smoothing circuit for producing said direct current data signal from said direct current signal.

7. A passenger detecting system according to claim 1, wherein said detecting circuit includes:
   a rectifier for half wave rectifying said line voltage of alternating current into a direct current signal; and
   a smoothing circuit for producing said direct current data signal from said direct current signal.

8. A passenger detecting system according to claim 7, wherein said rectifier includes an operation amplifier having an inversion terminal connected to a predetermined voltage and a non-inversion terminal connected to said line voltage.

9. A passenger detecting system according to claim 1, further comprising a buffer circuit provided between said resistor and said antenna electrode and having a high impedance on an input side and a low impedance on an output side.

10. A passenger detecting system according to claim 1, wherein said signal generating circuit supplies said supply signal of a direct current, and
    wherein said detecting circuit includes a switching element connected between said resistor and a ground level, for being switched between an on state and an off state in response to a control signal from said control circuit such that a pulse signal is supplied to said antenna electrode.

11. A passenger detecting system according to claim 1, further comprising:
    a plurality of said antenna electrodes; and
    a switching circuit provided between said resistor and said plurality of antenna electrodes, for selectively supplying said supply signal to one of said plurality of antenna electrodes in response to a switching control signal from said control circuit.

12. A passenger detecting system according to claim 10, further comprising:
    a plurality of said antenna electrodes;
    a plurality of circuit sets respectively provided for said plurality of antenna electrodes, each of said circuit sets including said signal generating circuit and said detecting circuit; and
    a switching circuit provided between said control circuit and said plurality of circuit sets, for selectively supplying said control signal to one of said plurality of circuit sets in response to a switching control signal from said control circuit.

13. A passenger detecting system according to claim 11, wherein said control circuit:
    produces signal data from said detected direct current data signals corresponding to said plurality of antenna electrodes,
    calculates a summation of said signal data, and
    determines, based on said summation of said signal data, whether or not a passenger is present in said scat.

14. A passenger detecting system according to claim 11, wherein said control circuit:
    produces signal data from said detected direct current data signals corresponding to said plurality of antenna electrodes,
    calculates a summation of said signal data,
    determines, based on said summation of said signal data, whether or not a passenger is present in said seat,
    normalizes each of said signal data based on a maximum one of said signal data,
    calculates a summation of said normalized signal data, and
    determines, based on said summation of said normalized signal data, whether a detected passenger in said seat is an adult or a child.

15. A passenger detecting system according to claim 14, wherein said control circuit further calculates a gravity of said normalized signal data, and determines, based on said summation of said normalized signal data and said calculated gravity, whether said detected passenger is an adult or a child.

16. An air bag apparatus comprising a passenger detecting system and an air bag control system, wherein said passenger detecting system comprises an antenna electrode provided in a seat to be occupied by a passenger;

a signal generating circuit for generating and supplying a supply signal to said antenna electrode though a resistor such that an electric field is generated around said antenna electrode;

a detecting circuit including said resistor, for detecting a direct current data signal from a line voltage associated with a voltage drop across said resistor, wherein said line voltage changes depending upon an object on said seat; and a control circuit for determining from said detected direct current data signal, whether or not a passenger is present in said seat and, when a passenger is present, whether said passenger is an adult or a child, and wherein said air bag control system is connected to said control circuit and sets an air bag to either an expansion allowed state or an expansion inhibited state based on the determination result by said control circuit.

17. An air bag apparatus according to claim 16, further comprising an amplitude control circuit for detecting an amplitude of said supply signal and adjusting the amplitude thereof to a predetermined value based on the detected amplitude.

18. An air bag apparatus according to claim 16, wherein said supply signal is an alternating current signal having a frequency of about 120 KHz and a voltage in a range of 5 to 12 V.

19. An air bag apparatus according to claim 16, wherein said detecting circuit includes a converter for converting said line voltage of alternating current into a direct current signal.

20. An air bag apparatus according to claim 19, wherein said detecting circuit further includes an impedance converting circuit provided between said resistor and said converter and having a high impedance on an input side and a low impedance on an output side.

21. An air bag apparatus according to claim 16, wherein said detecting circuit includes:

a rectifier for full wave rectifying said line voltage of alternating current into a direct current signal; and a smoothing circuit for producing said direct current data signal from said direct current signal.

22. An air bag apparatus according to claim 16, wherein said detecting circuit includes:

a rectifier for half wave rectifying said line voltage of alternating current into a direct current signal; and a smoothing circuit for producing said direct current data signal from said direct current signal.

23. An air bag apparatus according to claim 22, wherein said rectifier includes an operation amplifier having an inversion terminal connected to a predetermined voltage and a non-inversion terminal connected to said line voltage.

24. An air bag apparatus according to claim 16, further comprising a buffer circuit provided between said resistor and said antenna electrode and having a high impedance on an input side and a low impedance on an output side.

25. An air bag apparatus according to claim 16, wherein said signal generating circuit supplies said supply signal of a direct current, and wherein said detecting circuit includes a switching element connected between said resistor and a ground level, for being switched between an on state and an off state in response to a control signal from said control circuit such that a pulse signal is supplied to said antenna electrode.

26. An air bag apparatus according to claim 16, further comprising:

a plurality of said antenna electrodes; and a switching circuit provided between said resistor and said plurality of antenna electrodes, for selectively supplying said supply signal to one of said plurality of antenna electrodes in response to a switching control signal from said control circuit.

27. An air bag apparatus according to claim 25, further comprising:

a plurality of said antenna electrodes;

a plurality of circuit sets respectively provided for said plurality of antenna electrodes, each of said circuit sets including said signal generating circuit and said detecting circuit; and a switching circuit provided between said control circuit and said plurality of circuit sets, for selectively supplying said control signal to one of said plurality of circuit sets in response to a switching control signal from said control circuit.

28. An air bag apparatus according to claim 26, wherein said control circuit:

produces signal data from said detected direct current data signals corresponding to said plurality of antenna electrodes, calculates a summation of said signal data, and determines, based on said summation of said signal data, whether or not a passenger is present in said seat.

29. An air bag apparatus according to claim 26, wherein said control circuit:

produces signal data from said detected direct current data signals corresponding to said plurality of antenna electrodes, calculates a summation of said signal data, determines, based on said summation of said signal data, whether or not a passenger is present in said seat, normalizes each of said signal data based on a maximum one of said signal data, calculates a summation of said normalized signal data, and determines, based on said summation of said normalized signal data, whether a detected passenger in said seat is an adult or a child.

30. An air bag apparatus according to claim 29, wherein said control circuit further calculates a gravity of said normalized signal data, and determines, based on said summation of said normalized signal data and said calculated gravity, whether said detected passenger is an adult or a child.

* * * * *